(12) United States Patent
Peterson

(10) Patent No.: US 9,124,483 B2
(45) Date of Patent: Sep. 1, 2015

(54) NETWORK OPTIMIZATION

(75) Inventor: Benjamin K. Peterson, Superior, CO (US)

(73) Assignee: Level 3 Communications, LLC, Broomfield, CO (US)

( * ) Notice: Subject to any disclaimer, the term of this patent is extended or adjusted under 35 U.S.C. 154(b) by 716 days.

(21) Appl. No.: 13/281,372

(22) Filed: Oct. 25, 2011

(65) Prior Publication Data

US 2013/0003605 A1 Jan. 3, 2013

Related U.S. Application Data

(60) Provisional application No. 61/406,553, filed on Oct. 25, 2010.

(51) Int. Cl.
*H04L 12/24* (2006.01)
*H04L 12/751* (2013.01)
*H04L 12/721* (2013.01)
*H04Q 11/00* (2006.01)

(52) U.S. Cl.
CPC .............. *H04L 45/02* (2013.01); *H04L 41/145* (2013.01); *H04L 45/12* (2013.01); *H04Q 11/0062* (2013.01); *H04L 41/0826* (2013.01); *H04L 41/142* (2013.01); *H04Q 2011/0086* (2013.01)

(58) Field of Classification Search
None
See application file for complete search history.

(56) References Cited

U.S. PATENT DOCUMENTS

| 6,363,334 | B1 | 3/2002 | Andrews et al. |
| 2003/0158765 | A1 | 8/2003 | Ngi et al. |
| 2009/0103453 | A1 | 4/2009 | Hand |
| 2010/0023607 | A1 | 1/2010 | Venugopal et al. |
| 2010/0214957 | A1* | 8/2010 | De Carvalho Resende et al. ............... 370/255 |

OTHER PUBLICATIONS

"International Search Report, Intl Appl. No. PCT/US11/57753", Intl Filing Date Oct. 25, 2011, 5 pgs.
"Written Opinion, Intl Appl. No. PCT/US11/57753", Intl Filing Date Oct. 25, 2011, 8 pgs.
International Preliminary Report on Patentability, mailed May 10, 2013, Intl Appl. No. PCT/US11/057753, Intl Filing Date Oct. 25, 2011, 10 pgs.
Chinese Examination Report, dated May 5, 2015, Application No. 201180062713.5, filed Oct. 25, 2011; 16 pgs.

* cited by examiner

*Primary Examiner* — Mohammad Adhami

(57) ABSTRACT

Aspects of the present disclosure involve a method for optimizing an extension of an optical network to provide service to one or more new customers. The method considers the location of existing network nodes as well as a metropolitan environment where the new customer is located (e.g., the geographical location of streets where fiber may be routed to a customer). Aspects of the present disclosure further employ one of various linear programming models, such as a 1-Layer Model, a 3-Layer Model, a 5-Layer Model and a Dual Path Model to generate cost effective solutions to extend the existing optical network to provide service to the new customers.

18 Claims, 7 Drawing Sheets

NETWORK OPTIMIZATION

CROSS REFERENCE TO RELATED APPLICATIONS

The present non-provisional utility application claims priority under 35 U.S.C. §119(e) to U.S. Provisional Patent Application No. 61/406,553 titled "Network Optimization" including Appendix A, filed on Oct. 25, 2010, which is hereby incorporated by reference herein.

TECHNICAL FIELD

Embodiments presently disclosed generally relate to network communications. More specifically, embodiments herein relate to the design and optimization of network paths and configurations.

BACKGROUND

Building a network or adding to a network within a metropolitan area is a complicated and expensive endeavor. Construction of such a network typically involves trenching streets, physically laying the fiber in the trenches, and then resurfacing the impacted streets, among other things. In some estimates, this expense is considerable and may be as much as hundreds of thousands of dollar per city block. Often, particularly with networks relying on fiber-optic cabling, building such a network requires carefully planning where it is possible to lay fiber and then working closely with local governments and businesses that will be impacted when construction of the fiber network commences. The task is complicated as the network design must account for the locations where it is possible to build the network, must include physical connections to various customers located in buildings within the metropolitan area, and may also require redundant physical connections to those customers. It is with these issues in mind, as well as others, that various aspects of the present disclosure were developed.

SUMMARY

Aspects of the present disclosure involve a method for optimizing an extension of an optical network to provide service to one or more new customers. The method considers the location of existing network nodes as well as a metropolitan environment where the new customer is located (e.g., the geographical location of streets where fiber may be routed to a customer). Aspects of the present disclosure also involve a computer network configured in accordance with the methods discussed herein.

In one more particular aspect of the present disclosure, a computer network comprises an optical communication network extending an existing optical communication network comprising at least a first node and a second node, the optical communication network to provide service to at least one new customer location when the prize (e.g., the net present value of the revenue for connecting the customer) exceeds the cost to provide service to the customer using the new fiber (e.g., cost of extending fiber to the customer and/or the cost of the equipment to connect the customer's equipment to the existing network). The optical communication network comprises at least one fiber path between the first node and the second node, the optical communication network configured in accordance with an integer programming model that executes using a linear programming application that includes the computer executable or otherwise computer operations of identifying a plurality of arc paths and a plurality of nodes of a potential extension of the existing optical communication network sufficient to connect at least one potential customer location to the existing communication network. The at least one potential customer location includes the at least one new customer location and is associated with a value for connecting the at least one potential customer location to the existing optical communication network. The integer programming model or otherwise the integer programming application is further configured to optimize a summation of the value of connecting each of the at least one potential customer location less a cost of connecting each of the at least one potential customer locations using a combination of the plurality of arc paths beginning at the first node of the existing optical communication network and ending at the second node of the existing optical communication network. The integer programming application receives as inputs at least one parameter, at least one variable, and a plurality of constraints including at least one connectivity constraint, at least one saturation constraint, at least one service constraint, and at least one distance constraint, the at least one distance constraint causing the combination of arc paths to not form an isolated loop.

In another aspect, the optical communication network is further configured in accordance with a solution to an integer programming model comprising providing for at least three different types of connection paths to the at least one potential customer location, the types of connection paths comprising a ring path, a protected lateral path, and an unprotected lateral path. The value of connecting the at least one potential customer location including one or more values accounting for whether the path is the ring path the protected lateral path or the unprotected lateral path. Finally, the at least one distance constraint includes at least a first distance constraint associated with the ring path and establishing about a maximum distance for the ring path, a second distance constraint associated with the protected lateral path and establishing about a maximum distance for the protected lateral path, and a third distance constraint associated with the unprotected lateral path and establishing about a maximum distance for the unprotected lateral path.

In another aspect, the optical communication network is further configured in accordance with a solution to an integer programming model further wherein the cost of connecting each of the at least one potential customer locations includes at least one equipment type for connecting the at least one potential customer to the existing network and the at least one distance constraint accounts for a range of the at least one equipment type such that a path for connecting the at least one potential customer location to the existing network does not exceed the range of the at least one equipment type.

BRIEF DESCRIPTION OF DRAWINGS

The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

Throughout the drawing figures, like reference numerals will be understood to refer to like parts and components.

DETAILED DESCRIPTION

Aspects of the present disclosure involve a system, apparatus and method for optimizing a network configuration including determining whether to build the infrastructure necessary to connect a potential customer to a network and cost-effective network paths to connect the customer. Further, aspects of the present disclosure involve a network configuration optimally constructed in accordance with the systems and method discussed herein. For example, any given metropolitan area may include numerous entities, such as universities, government institutions and businesses that require high-speed connections to computer networks. Oftentimes, however, such customers are in developed metropolitan areas where it is costly to build the network infrastructure to connect that customer to a network. One aspect of the cost is the need to physically route optical fiber or other high-speed digital communication channels to the entity. Accordingly, one aspect of the present disclosure identifies the potential value of connecting an entity (customer) to a network, identifies various costs of connecting the customer, and determines whether to connect the customer and the optimal paths, which may be along and under existing metropolitan streets, to connect the customer to the network.

The systems and methods discussed herein may involve the expansion of an existing network such as a metropolitan fiber-optic network. The system is initialized with or otherwise begins with the geographic locations of all potential new customers in a particular geographic area, as well as the expected revenues and equipment costs for services that each would purchase. The system also considers existing mapping data for the region and the geographic location of existing network components, such as optical fiber pathways and gateways, in the region. The system may design new network configurations, such as the locations of where to position fiber to reach a customer, based on branching from existing network infrastructure. Aspects of the present disclosure also include a network based on the methods discussed herein.

Figure 1:
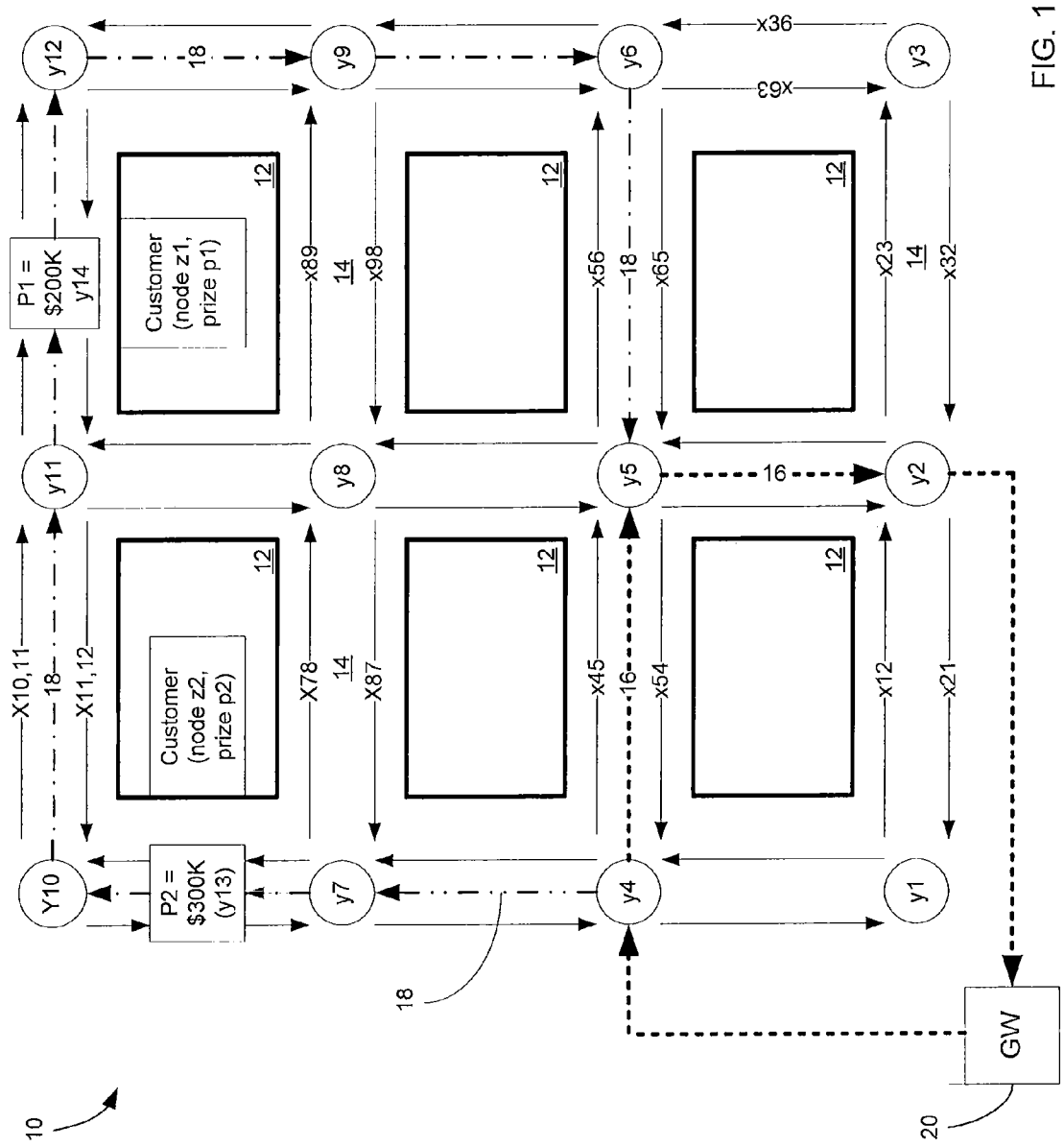
FIG. 1 is a diagram depicting one example of an extension of an existing optical network based on a 1-Layer linear programming model.

FIG. 1 is a diagram depicting a section of a metropolitan area 10 with several city blocks 12 and various streets 14. For ease of reference and description, only a small section of a representative metropolitan area is shown. Aspects of the present disclosure, however, may be applicable to any size metropolitan area as well as any other geographical area where potential customers may be identified and routes to connect those customers to a network may be identified.

In this example metropolitan area, a section of existing fiber-optic cabling 16 is shown in dashed line. The existing fiber 16 is coupled in a loop with a gateway 20 connected along the loop. The gateway is conventional network component that provides an interface between networks. In some examples discussed herein, the system determines whether and where to connect new fiber to existing fiber 18, and the system may take into account the location of existing fiber 16 and the gateway 20 or other components. It is possible to consider other network components, such as routers and switches, when determining at which node to connect new network fiber to existing network fiber. For example, a network provider may have fiber cabling (e.g., fiber 16) in a first section of a metropolitan area adjacent to a second section of the metropolitan area where the network provider does not have existing fiber. Aspects of the present disclosure allow the network provider to evaluate whether to invest in routing fiber into the second section, where to connect the new fiber to the existing fiber, and the optimal path of the fiber to connect the new customer or customers.

Additionally, many customers require redundant protection paths to their facilities. Hence, it is often the case that a network provider not only has to connect the customer to its network but also has to provide a second, redundant path to the customer. Aspects of the present disclosure also provide optimal paths to provide such redundant connections. Moreover, aspects of the present disclosure provide for designing network configurations where new customers may obtain a redundant protection path and other new customers may not receive such a path while yet other customers may receive a hybrid protective path. Some customers, for example may request an unprotected path which may be provided at a lower cost.

Referring to FIG. 1, the metro street network 10 includes street segments and street intersection points. This network may be represented by a graph with a node set N and an arc set A. The node set N includes a node, such as the y nodes in FIG. 1, representing each street intersection and the arc set A includes a pair of arcs, such as the arcs x12, x21, etc., representing each street segment. The nodes set N and the arc set A may be generated from existing geographic information system (GIS) data sets such as is available from ArcGIS™. In the system discussed herein, two arcs (one in each direction) are used for each street in order to simplify the routing constraints. The graph also has a designated set of nodes $E \subseteq N$ that are connected by existing fiber and a set of potential customer sites $C \subseteq N$ that the system will consider in determining an optimal solution of connecting (and where to bury) new fiber to reach the customer sites. In some rare instances the system may generate a solution indicating that extending the existing network is not cost effective.

One purpose of the system is to choose a set of arcs (x12, x21, etc.) where fiber 18 can be buried to expand the network 16 and reach some or all of the potential customers, such as customers z1 and z2 depicted in FIG. 1. A prize value $p_n > 0$ is assigned to each customer node ($n \in C$). The prize value represents a value attributed to servicing that customer on the fiber network. The prize value may be the net present value of the projected revenue from the customer. The system does not attribute a prize value to nodes that are not associated with a customer (e.g., non-customer nodes $n \in N/C$). Further, the system includes a cost value for each arc $(n, m) \in A$. The cost value represents the costs attributed to burying fiber along the street represented by the arc (n, m). So, for example, the system takes into account the actual costs for digging a trench in the street, among others. In one example, the system may access a table that includes a cost value on a per foot or other basis for laying new fiber along a street in particular metropolitan area. Thus, arc x12 will have an associated cost $C_{nm}$. The model objective function, discussed in further detail below, maximizes the sum of the prize values of all potential customer nodes connected minus the sum of the cost values of all arcs used.

Continuing with the example embodiment above, one or more mixed-integer linear programming models may be employed to solve the problem of optimal routing of network cabling in a metropolitan area or other geographic area as well as identifying customers in the metropolitan area to which to provide a network connection. Generally speaking, linear programming is a mathematical method for determining a way to achieve some optimal outcome for a complex system.

A linear programming model typically includes four components: variables, parameters, an objective function and constraints. In some cases, linear programming may be limited to the use of integer values or a mixture of integer and non-integer values within the models. The present disclosure identifies a 1-Layer Model, discussed a first, 3-Layer Model, a 5-Layer Model as well as alternative models using some aspects of the five layer model. The third, fifth and alternative models build upon the concepts introduced in the first model. Thus, our discussion now turns to the 1-Layer Model.

1-Layer Model

The 1-Layer Model includes various variables, sets, parameters, an objective function and various constraints. "Variables" represent the controllable factors that the model solves for, which in this example include the arcs x upon which fiber will be buried or otherwise routed, the potential new network nodes y (intersections) that will be connected by the arcs x, the particular customer nodes z that meet the prize criteria and will be connected by the new fiber, and a distance variable d that is related to a lower bound on the physical distance from an existing network node to a node in the new network extension. "Parameters" represent identifiable data that affect the model or are otherwise factors in solving the problem, such as the prize of connecting a potential customer node (e.g., the net present value of a customer node), the cost of laying the fiber, the length of the various streets (arcs) available to route fiber, and a value M in the model. The objective function quantifies the goal of the model. In the case of the 1-Layer Model, as well as the other models generally, the objective function maximizes or otherwise optimizes the prize for connecting some set of customer nodes to an existing network with respect to the cost of connecting the customer nodes. The model initially considers a set of possible customer nodes and generates a result of some subset of all possible customer nodes (may include all possible nodes) along with a solution of where the new network extension connects to the existing network as well as the topology of the new fiber or connections needed to provide service to the new customers. "Constraints" represent requirements to which the model conforms, such as that a node can only be in the network if an arc is in the network, or that an arc can only be in the network if it comes from a node in the network. Stated differently, constraints represent requirements needed for a feasible solution.

Returning again to FIG. 1, a network representation is overlaid on the representative metropolitan area 10. The network representation includes several nodes y (node variables) interconnected by various possible fiber paths x (arc variables). Each node represents a location that may or may not include fiber entering and leaving the node along the various possible fiber paths connected with the node. The paths are directionally illustrated. Thus, for example, path (or arc variable) x12 represents a possible fiber connection from node y1 to node y2 whereas path x21 represents a possible fiber connection from node y2 to node y1. Should fiber actually be routed in the street between nodes y1 and y2 it will be bidirectional but the modeled directional representation of the arcs is useful in solving portions of the models discussed herein. Additionally, the network representation includes customers or "prizes" represented by customer nodes z1 and z2 and associated prize values p1 and p2. The customer nodes may represent customer facilities (e.g., universities, government facilities, businesses) that may be connected through new fiber and from which some value is derived if a connection and service is provided to that customer. Each customer location is a type of node. However customer locations have a value associated with the node representing the benefit of connecting the node to the network. In the implementation discussed herein, it will always be the case that a customer is connected to the network when the benefit is greater than the cost of connecting the node.

Table 1 provides a list of parameters used in the 1-Layer Model. The "prize" parameter represents the value of providing a fiber connection and service to a potential customer node n. In one example, the value is determined by obtaining the net present value for a given customer taking into account the fees the customer is projected to pay for obtaining service. Table 1 further identifies a cost parameter for physically routing a fiber optic link along a particular arc. As discussed herein, the system defines various arcs which are representative of actual street locations in a metropolitan area. A cost parameter is defined for each possible arc between two nodes. Thus, for example, the system includes or otherwise accounts for a cost parameter between nodes y1 and y2 along arc x12, as well as other arcs shown in FIG. 1.

TABLE 1

1-Layer Model Parameters

| | Parameters |
|---|---|
| 1 | $P_n$ = "prize" value of connecting a potential customer node n |
| 2 | $C_{nm}$ = cost of laying fiber on the street represented by (n, m) |
| 3 | $L_{nm}$ = physical length of the street represented by(n, m) |
| 4 | M = a large number used in the routing constraints |

Notes:
$C_{nm} = C_{mn}$ and $L_{nm} = L_{mn}$

Finally, the "M" parameter is an integer value that is used by the solver to optimize the generation of feasible solutions. Generally speaking, relatively higher M values cause the constraints to be less effective. A relatively lower M value reduces the physical size of solutions that are feasible in the model.

TABLE 2

1-Layer Model Sets

| | Sets |
|---|---|
| 1 | $\delta^+(n)$ = set of arcs with head at node n |
| 2 | $\delta^-(n)$ = set of arcs with tail at node n |
| 3 | E = set of nodes connected by existing fiber (E ⊆ N) |
| 4 | C = set of potential customer nodes (C ⊆ N) |

Table 2 provides a list of sets that further define the 1-Layer Model and the data graph upon which the model acts to solve the objective function. The first two sets involve the set of arcs with a head at node n and the set or arcs with a tail at node n.

Referring to FIG. 1, arc x12 has its tail at node y1 and its head at node y2. Each arc may be defined in a directional manner with head and tail definitions. This information is useful in ensuring that some constraints are met and the model produces a feasible solution. For example, the 1-Layer Model is constrained to solutions where a connected node has an arc entering and leaving the node. This ensures that any network extension does not terminate at a node other than a node from the existing network, which in turn helps to ensure that each connected customer has a protected connection. In the 1-Layer Model, a protected connection indicates that a physical cut along some street that would sever one fiber connection cannot result in a cut to the second fiber connection to the customer. Such a result may be achieved, for example, if the two paths to the customer do not originate or terminate at the same existing network node and do not overlap along any street to the customer. Accordingly, each connected node includes a set of arcs with at least one arc entering the node and one arc leaving the node.

The third set E defines the set of nodes connected by existing fiber. As discussed, in some instances, the various models discussed herein define solutions for extending an existing network to reach new customers where a fiber link does not currently exist to provide service to the potential customer. The node set E defines those nodes of the existing network to which a connection may be made to extend the new network. Finally, the fourth set C defines the set of all potential customer nodes.

TABLE 3

1-Layer Model Variables

| | Variables | Count | Domain |
|---|---|---|---|
| 1 | $x_{nm} = \begin{cases} 1 \text{ if fiber will be buried along arc } (n, m) \\ 0 \text{ otherwise} \end{cases}$ | $\forall (n, m) \in A$ | binary |
| 2 | $y_n = \begin{cases} 1 \text{ if node n will be connected to the fiber network} \\ 0 \text{ otherwise} \end{cases}$ | $\forall n \in N$ | binary |
| 3 | $z_n = \begin{cases} 1 \text{ if potential customer node n meets all service} \\ \quad \text{criteria for collecting its "prize"} \\ 0 \text{ otherwise} \end{cases}$ | $\forall n \in C$ | binary |
| 4 | $d_n$ = lower bound on distance from the existing network to node n along a directed fiber path | $\forall n \in N$ | continuous |

Notes:
$x_{nm} = 1$ and $x_{mn} = 1$ both represent the same physical solution: that fiber will be buried under the street represented by arcs (n, m) and (m, n).

Turning now to Table 3, an identification of the variables for the 1-Layer Model is provided. To begin, the 1-Layer Model includes arc x and node y variables. An arc variable is set to 1 when the model determines that fiber should be buried along the street associated with the arc or otherwise that a fiber connection should be made along the identified sheet or location. Further, when a particular arc variable is set to 1 it also means that there is a customer along some path including the particular arc where there is a sufficient prize to justify the cost of providing, service to the customer. While the arc data is directional (e.g., it includes head and tail information), an arc variable representing a certain street has the same physical results as the arc variable in the opposite direction along the same street. Stated differently, if arc variable x12 is set to 1 or arc variable x21 is set to 1, the result will be the same physical solution of laying fiber along the street represented by both arcs x12 and x21. Similarly, a node variable is set to 1 when it is connected to the existing fiber network. Thus, when a node variable is set to 1 it indicates that there is an arc entering and leaving the node along some path that includes a customer with a sufficient prize along with two distinct connections to the existing network.

Table 3 also identifies a customer node variable z that represents whether a customer node meets all of the criteria for collecting the prize. Finally, Table 3 illustrates a distance variable that sets a lower bound on the distance from the existing network to a node n along a path.

The following is the objective function for the 1-Layer Model.

Objective $$\text{Maximize} \sum_{n \in C} P_n z_n - \sum_{(n,m) \in A} C_{nm} x_{nm}$$

As can be seen, the objective function maximizes the summation of the prize value for each connected customer node less the summation of the cost of laying fiber along each arc.

The solution to the model provides a set of arcs that define a path between the existing network to a new customer and then back to the existing network to provide the customer with protected service.

To provide a feasible solution, the 1-Layer Model may also consider several constraints identified in Tables 4A-4D. To begin, Table 4A defines several connectivity constraints.

TABLE 4A

1-Layer Model Connectivity Constraints

| | Connectivity Constraints | Count |
|---|---|---|
| 1 | $y_n = 1$ | $\forall n \in E$ |
| 2 | $\sum_{(n,m) \in \delta^+(m)} x_{nm} \geq y_m$ | $\forall m \in N/E$ |
| 3 | $x_{nm} \leq y_m$ | $\forall (n, m) \in A$ |
| 4 | $y_n \leq \sum_{(n,m) \in \delta^-(n)} x_{nm}$ | $\forall n \in N/E$ |
| 5 | $y_n \geq x_{nm}$ | $\forall (n, m) \in A$ |

Notes:
The connectivity constraints require each connected node to have a fiber arc directed into it and out of it, and an arc can only have fiber if its head and tail are connected nodes. These will also help force the solution to be composed only of directed loops.

Collectively, these constraints help to ensure that model generates a path of connected arcs that begin and terminate at different points of the existing network. Stated differently, the constraints collectively cause the formation of a ring structure. Thus, for example, referring to FIG. 1, the new network extension might begin at node y4 and terminate at node y5 but would not begin at node y4 and terminate at node y4 nor would the new network extension begin at node y4 and terminate at node y3 (a node not on the existing network 16). Firstly, the model sets all existing nodes of the set E to 1. Thus, because all nodes on the existing fiber are connected, the node variables are set to 1. This constraint also helps to force the model to connect the new network fiber to the existing network. Secondly, the model is constrained such that for each connected node there is at least one arc entering the node. Thus, for example, referring to FIG. 1, if node y3 is set to 1, then arc x23 (the arc from node y2 to node y3) and/or arc x63 (the arc from node y8 to y3) are set to 1. The third constraint prohibits building an arc from a node unless the node is connected.

Fourthly, the model is constrained such that there is an outgoing arc for each connected node and the outgoing arc is not along the same path as the incoming arc. Thus, with reference to FIG. 1, if node y3 is connected, arc x32 cannot be the outgoing arc if the incoming arc is x23. This ensures that the model generates a solution with a path back to the existing network. Finally, the fifth constraint requires that when an arc connects to a node (comes into the node), then the node is connected as well.

Referring now to Table 4B, a saturation constraint is shown. The saturation constraint ensures that the model only produces a result with fiber in one direction along a street. Thus, no street is defined as having fiber running in both directions. Since the actual fiber being laid in the street is bi-directional, the solution should not result in both x-variables for the same street (e.g. x12 and x21) but in opposite directions being each set to 1. Otherwise, a loop generated by the model may not match an actual physical loop that would be constructed.

TABLE 4B

1-Layer Model Saturation Constraint

| Saturation Constraints | Count |
|---|---|
| $x_{nm} + x_{mn} \leq 1$ | $\forall (n, m) \in A$ |

Table 4C illustrates a set of distance constraints for the 1-Layer Model. The distance constraints provide one way for the model to eliminate subtours in the solution (isolated cycles that are disconnected from the rest of the network). Stated differently, the distance constraints help to ensure that there is not a network loop in the solution that is disconnected from the rest of the network, whether the new network or the existing network. Distance constraints may also be required by some integer programming solvers that do not support cut generation if it changes the integer feasible region. Stated differently, some integer programming software that may be configured to run the models discussed herein and generate a solution may not be able to process certain models in which case the distance constraints will help generate a feasible solution.

TABLE 4C

1-Layer Model Distance Constraints

| | Distance Constraints | Count |
|---|---|---|
| 1 | $d_n = 0$ | $\forall n \in E$ |
| 2 | $-d_n + d_m \geq -M + (M + L_{nm}) x_{nm}$ | $\forall (n, m) \in A \mid m \notin E$ |

The first distance constraint sets the distance value for an existing node (in the existing network) to 0. The second constraint sets all connected nodes, beginning with the first node on the new network along a path from an existing node, to sequential distance values. Thus, referring to FIG. 1, node y4 would be set to 0, and node y7 would be set to some distance value, e.g., $d_n=10$, and then subsequently greater values along the path 18. This prevents a cycle from being integer feasible as it is not possible to come up with distance values such that all nodes along a path are greater than the previous node. For example, if the path 18 were to attempt to terminate at node y7 (forming a cycle) the arc connecting to node y7 would necessarily come from a node with a greater value than the distance value for node y7. With respect to the M constraint, its value effectively sets the maximum distance of a loop that can be returned as a solution. So, for example, if the model is referencing feet, then a value of M=250,000 feet might be chosen, allowing for feasible solutions with a maximum path length of nearly 50 miles. In some situations, a new network loop of 50 miles, beginning and ending along an existing network and connecting some number of customers, may be a desirable solution.

Table 4D illustrates a service constraint for the 1-Layer Model. The service constraint constrains the model to produce a result that a node prize cannot be collected unless the node is connected to the network. Thus, $z_n$ cannot be equal to 1 unless $y_n$ for the same node in the network is 1 indicating that the node is connected to fiber entering and leaving the node.

TABLE 4D

1-Layer Model Service Constraints

| | Service Constraints | Count | Comparison to 1-Layer Model |
|---|---|---|---|
| 1 | $z_n^P \leq y_n^R + y_n^P$ | $\forall n \in C$ | Modified |
| 2 | $z_n^U \leq y_n^R + y_n^P + y_n^U$ | $\forall n \in C$ | Modified |
| 3 | $z_n^P + z_n^U \leq 1$ | $\forall n \in C$ | Modified |

Referring again to FIG. 1, a feasible solution is illustrated in pseudo-dashed line 18. As can be seen, the solution beings at node y4, which is an existing node in the existing network 16. The solutions proceeds down the street between node y4 and y7, entering and leaving both nodes in the same direction, and proceed to node y10, while capturing customer node z2 associated with prize p2. The solution then defines a fiber connection from node y10 to y11 and y12, capturing customer node z1, and then proceeds to y9 and y6 and terminates at node y5 on the existing network 16.

Although the distance variables and various constraints in the 1-Layer Model may eliminate subtours in the solution, they have a weak linear relaxation and make the model difficult to practically solve with reasonable computing power. Thus, an alternative approach to solving the model, employs a delayed-cut generation technique.

At each node of a branch-and-cut solution tree, the system computes maximum flows from the set of existing fiber nodes E to each potential customer node $n \in C$ for which $y_n > 0$. In this flow problem the system sets the capacity of each arc (n,m) to the value of $x_{nm}$ in the current solution for the 1-Layer Model. If the maximum flow is less than $y_n$ then the system finds the minimum-size graph cut (S,T) such that $E \subseteq S$, $n \in T$ and $S \cup T = N$. The system then uses the following additional integer programming cut to the 1-Layer Model.

$$y_n \leq \sum_{s \in S, t \in T} x_{st}$$

The system also uses a similar technique for the reverse flow from $n \in C$ to E to help establish a directed loop from E to $n \in C$ and back to E. Unlike some conventional cut procedures, the present system computes flows in both directions and an augmenting path algorithm is used to compute the maximum flows in place of other algorithms such as a push-relabel algorithm.

3-Layer Model with Two Service Levels

In the 1-Layer Model above, all points on the new network have a "protected" connection. That is, customers have two distinct paths connecting them to the existing network so that they remain connected even if a fiber is cut. Thus, for example, referring to FIG. 1, the path 18 provides two distinct paths to customer nodes z1 and z2, one path originates at node y4 and the other path originates at node y5. Thus, if there is a cut between node y4 and customer node z1 or z2, service can be provided from node y5. Stated differently, there is no single cut that will disrupt service provided from the existing network 16 by way of nodes y4 or y5.

It is often unnecessary or impractical, however, to provide protected connections for some areas of the network. First, some customers do not buy protected service, and will accept some disconnection risk in exchange for lower prices. Second, two distinct paths may not exist to some locations. For example, a customer may be physically located at the end of a dead-end street and there is not two distinct streets or accesses to the customer location. Third, there may be instances where the customer may be reached at considerably lower cost if a single street can be used for a small section of the path. Finally, there may be instances where the actual connection point to a customer is not well defined in terms of the maps used to generate the arcs or is not along a mapped street—perhaps the customer building is in a parking lot or substantially offset from the street. In such instances, it is helpful to allow for short stubs or laterals to provide the final connection distance to a customer when the customer is not located along a street defined in the model. Thus, a significant and large percentage of the service to a customer is protected but some small segment may not be protected.

For these and other reasons, in the described 3-Layer Model, two possible levels of service quality are provided for a connection to each potential customer: (1) a protected service that permits the last $D_1$ meters of the connection path to use only a single street as long as fiber is buried along both sides (FIG. 2), and (2) an unprotected service that permits the rules of protected service plus another $D_2$ meters of connection path using only a single fiber (FIG. 3). In the first situation there may be a fully protected path as discussed in the first model or, redundant fibers are placed on opposing sides of the street, for example, and hence a service interruption from a cut would require a cut that extends from one side of the street to the other. In practical application such a physical implementation provides a significant level of protection but is not considered a fully "protected" service. In the second situation, a majority of the path to a customer is protected but a small section of distance $D_2$, (such as a stub or lateral extending from a protected loop) is not redundantly deployed or otherwise protected. Hence, a cut along this short stub section would cut off service to the customer. In practical implementation, such a compromise provides a well protected service but does not meet the stringent requirements of a fully "protected" service and is not otherwise protected or discussed herein.

To model these different connection types, three modified copies of the previously-defined 1-Layer Model are solved simultaneously, with certain coupling constraints relating them. This 3-Layer Model has a ring layer, a protected lateral layer, and an unprotected lateral layer, labeled R, P and U respectively. The ring layer defines one or more main loops of the network, and is nearly identical to the 1-Layer Model. Thus, the ring layer provides protected service. The protected lateral layer defines single-street but dual-fiber laterals that may branch off from either the main loop or another protected lateral. A protected lateral layer thus has two fiber paths to the connected customer but those paths may be along the same street. The unprotected lateral layer defines single-fiber laterals that may branch off from a ring, a protected lateral, or another unprotected lateral. The unprotected lateral thus only has one fiber, for a short distance, connecting the customer. The constraints of all the layers have many things in common so they are defined collectively below.

Figure 2:
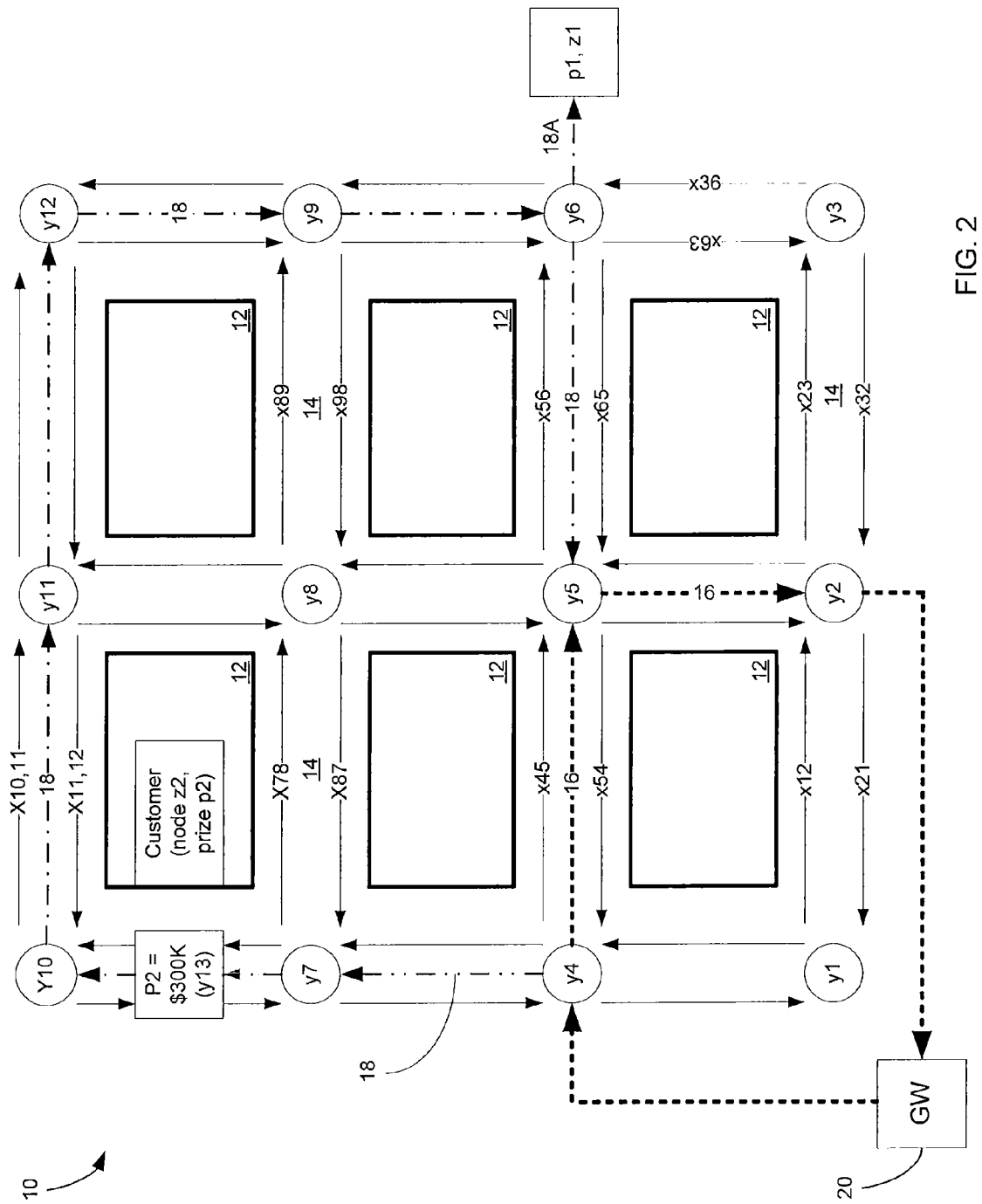
FIG. 2 is a diagram depicting one example of an extension of an existing optical network based on a 3-Layer linear programming model.
Figure 3:
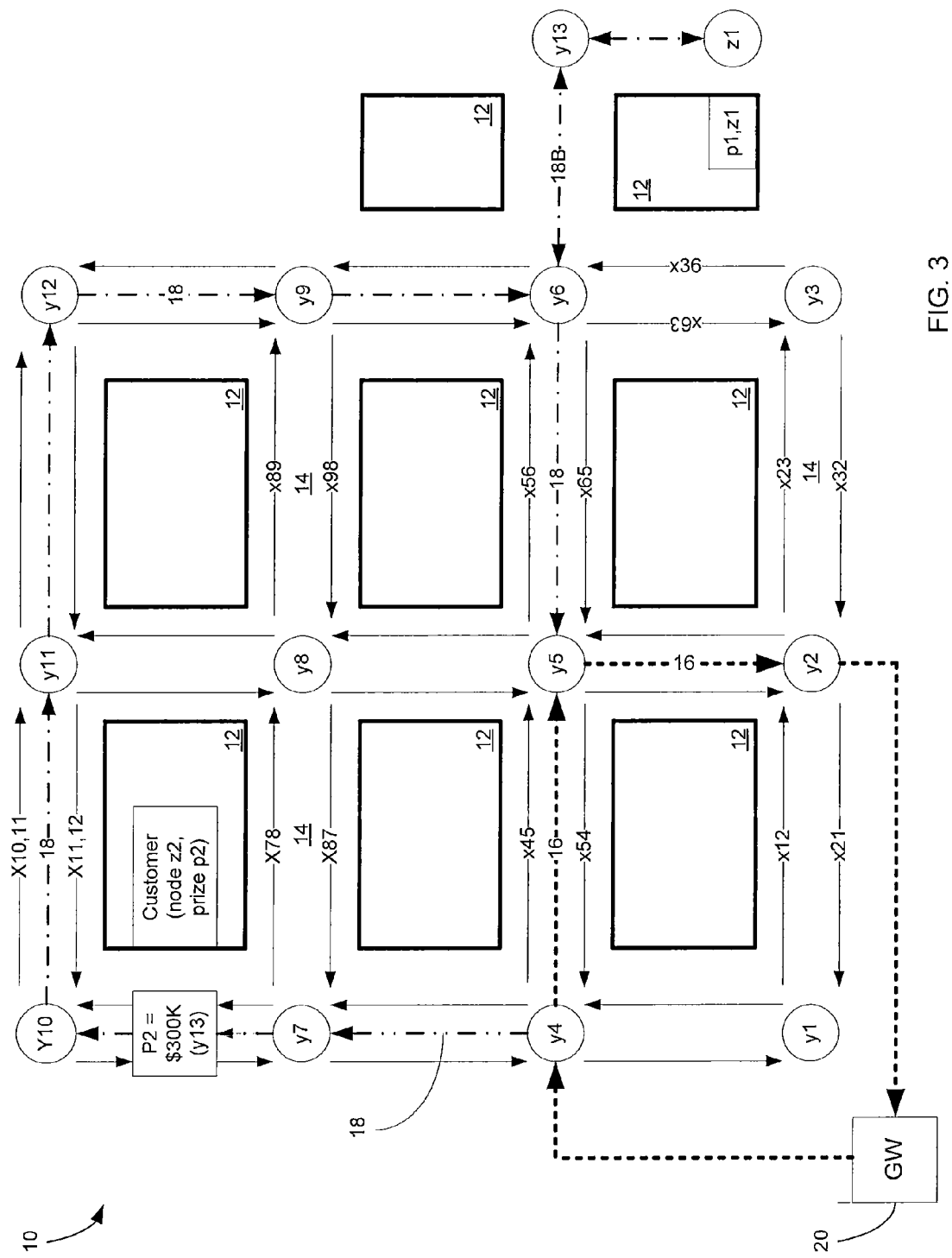
FIG. 3 is a diagram depicting another example of an extension of an existing optical network based on the 3-Layer linear programming model.

FIG. 2 illustrates a network extension 10 substantially the same as shown in FIG. 1. Here, however, the network extension includes a protected lateral extension 18A to a customer node Z1 associated with prize P1 (protected lateral). The protected lateral 18A is connected with a ring 18 that begins at node y4 and ends at node y5. FIG. 3 also illustrates a network extension 10 substantially the same as shown in FIG. 1. Here, however, the network extension includes an unprotected lateral 18B that extends through node y13 to a customer node Z1 associated with prize P1 (unprotected lateral). The unprotected lateral 18B is connected with ring 18.

Table 5 illustrates the 3-Layer Model parameters. To begin, like the 1-Layer Model, the 3-Layer Model includes prize parameters, cost parameters, street length parameters and a parameter M. The prize parameter differs from the 1-Layer Model while the other three parameters are substantially unchanged. The prize parameter differs in that a prize is assessed for each potential customer at each possible level of service—protected and unprotected. The model therefore permits different prizes for the different service levels. So, for example, the net present value for connecting a customer with a protected service may be different than the net present value of connecting a customer with an unprotected service. The model, however, does not permit the collection of more than one prize. The model merely can consider the different possible prizes for a customer. If a particular potential customer will not purchase a level of service even if made available, the prize value for that level of service may be set to zero (0).

TABLE 5

3-Layer Model Parameters

| | Parameters | Count | Comparison to 1-Layer Model |
|---|---|---|---|
| 1 | $P_n^l$ = "prize" value of providing level of service to potential customer node n. This value can be set to zero if the customer will not buy at a particular level. | $\forall l \in \{P, U\}$, $n \in C$ | Modified |
| 2 | $C_{nm}$ = cost of laying fiber on the street represented by (n, m) | $\forall (n, m) \in A$ | Unchanged |
| 3 | $L_{nm}$ = physical length of the street represented by (n, m) | $\forall (n, m) \in A$ | Unchanged |
| 4 | M = a large number used in the routing constraints | | Unchanged |
| 5 | $D^P$ = maximum length of a protected lateral | | New |
| 6 | $D^U$ = maximum length of an unprotected lateral | | New |

Additionally, the 3-Layer Model includes two new constraints. First, the 3-Layer Model is constrained to require that the maximum length of a protected lateral be no more than a distance $D^P$ parameter. Thus, an protected lateral fiber segment cannot exceed the distance $D^P$. Second, the 3-Layer Model is constrained to require that the maximum length of an unprotected lateral be no more than a distance $D^U$. Thus, an unprotected lateral cannot exceed the distance $D^U$ parameter. These distances are set to provide flexibility in designing the fiber network and connect as many customers profitably as possible while at the same time providing an acceptable level of service to the customers.

Table 6 illustrates the variables for the 3-Layer Model. The 3-Layer Model includes the same variables as the 1-Layer Model but each variable is modified to account for the additional layers. Notably, each variable type accounts for the three different possible layers representative of variables for a ring layer, protected lateral layer, and an unprotected lateral layer. Thus, for example, a particular y node for a connected path may be set to 1 for some but not all layers. In the case of the 3-Layer variables, each variable has the same connotation as set out in the 1-Layer Model. However, the 3-Layer Model includes a variable for each of the three layers.

TABLE 6

3-Layer Model Variables

| | Variables | Count | Domain | Comparison to 1-Layer Model |
|---|---|---|---|---|
| 1 | $x_{nm}^l = \begin{cases} 1 \text{ if fiber will be buried along arc } (n, m) \text{ on layer } l \\ 0 \text{ otherwise} \end{cases}$ | $\forall l \in \{R, P, U\}$, $(n, m) \in A$ | binary | Modified |
| 2 | $y_n^l = \begin{cases} 1 \text{ if node } n \text{ will be connected on layer } l \\ 0 \text{ otherwise} \end{cases}$ | $\forall l \in \{R, P, U\}$, $n \in N$ | binary | Modified |
| 3 | $z_n^l = \begin{cases} 1 \text{ if potential customer node } n \text{ meets all criteria for} \\ \quad \text{and will be connected with service level} \\ 0 \text{ otherwise} \end{cases}$ | $\forall l \in \{P, U\}$, $n \in C$ | binary | Modified |
| 4 | $d_n^l$ = distance from the "beginning" of a directed arc path to node on layer l | $\forall l \in \{R, P, U\}$, $n \in N$ | continuous | Modified |

The objective function, set forth immediately below, is also modified from the 1-Layer Model and accounts for the various layers. The general proposition remains the same—i.e., the function maximizes the summation of the prize for connecting customers calls the cost for connecting customers. The 3-Layer Model functions consider the prize value and cost for each level of service.

Objective

Maximize $\sum_{n \in C} (P_n^P z_n^P + P_n^U z_n^U) - \sum_{(n,m) \in A} (C_{nm} x_{nm}^L + 2 C_{nm} x_{nm}^P + C_{nm} x_{nm}^U)$ Notes:

Arcs on the protected lateral layer P have double cost because they require fiber to be buried along both of a street.

Table 7 illustrates the connectivity constraints for the 3-Layer Model. The first constraint sets all y values for the existing network to values of 1 on the ring layer. For the P and U layers, the first constraint sets all y values to 0. Thus, the existing network nodes are defined as part of the ring layer and not part of the protected or unprotected lateral layers. The second connectivity constraint is the same as in the 1-Layer Model except there is copy for each layer. Therefore, for each connected node of the various types, then there is at least one arc of the same type entering the node. For example, if a ring node is connected, then there is a ring arc entering the node. The third constraint is also similar to the 1-Layer Model but applies to the three layers. The third constraint requires that that an outgoing arc for a connected node is not along the same path as the incoming arc.

TABLE 7

3-Layer Model Connectivity Constraints

| | Connectivity Constraints | Count | Comparison to 1-Layer Model |
|---|---|---|---|
| 1 | $y_n^R = 1 \quad y_n^P = 0 \quad y_n^U = 0$ | $\forall n \in E$ | Modified |
| 2 | $\sum_{(n,m) \in \delta^+(m)} x_{nm}^l \geq y_m^l$ | $\forall l \in \{R, P, U\}$, $m \in N/E$ | Modified |
| 3 | $x_{nm}^l \leq y_m^l$ | $\forall l \in \{R, P, U\}$, $(n, m) \in A$ | Modified |

TABLE 7-continued

3-Layer Model Connectivity Constraints

| | Connectivity Constraints | Count | Comparison to 1-Layer Model |
|---|---|---|---|
| 4 | $y_n^R \leq \sum_{(n,m) \in \delta^-(n)} x_{nm}^R$ | $\forall n \in N/E$ (layer R only) | Modified |
| 5 | $y_n^R \geq x_{nm}^R$ | $\forall (n, m) \in A$ | Modified |
| 6 | $y_n^R + y_n^P \geq x_{nm}^P$ | $\forall (n, m) \in A$ | Modified |
| 7 | $y_n^R + y_n^P + y_n^U \geq x_{nm}^U$ | $\forall (n, m) \in A$ | Modified |

Notes:
The third constraint set which requires arcs out of each connected node applies only to the ring layer, since laterals may terminate at any node.
Laterals can start from arcs coming out of connected nodes in other, "more protected" layers.

The fourth constraint is applicable to only the ring layer, and it states that for each active node on the ring layer there is at least one arc exiting the arc on the ring layer. Similarly, the fifth constraint is also only applicable to the ring layer, and it states that a ring layer arc can only be active if it comes from a ring layer node. The sixth constraint also applies to an arc but is applicable to arcs on the protected layer, and states that an arc on the protected layer may come from a node on the ring layer or the protected layer. Thus, a protected lateral may come from a ring layer node or a protected layer node. Finally, the seventh constraint indicates that an arc on the unprotected layer may come from a node on the any of the ring, protected, or unprotected nodes.

Table 8 illustrates the saturation constraints for the 3-Layer Model. The first saturation constraint indicates that a node may occupy only one layer. Thus, if a node is active on the ring layer it cannot also be active on the protected or unprotected layer. The second saturation constraint is applicable to arcs on all layers, and requires that there be only one arc in one direction on one layer for a given street.

TABLE 8

3-Layer Model Saturation Constraints

| | Saturation Constraints | Count | Comparison to 1-Layer Model |
|---|---|---|---|
| 1 | $y_n^R + y_n^P + y_n^U \leq 1$ | $\forall n \in N$ | New |
| 2 | $x_{nm}^R + x_{mn}^R + x_{nm}^P + x_{mn}^P + x_{nm}^U + x_{mn}^U \leq 1$ | $\forall (n,m) \in A$ | Modified |

Notes:
Some indices are colored to emphasize their ordering.
A node or arc pair can be used in at most one layer.

Table 9 illustrates the distance constraints for the 3-Layer Model. The distance constraints include three entirely new constraints and two constraints that are modified versions of the two distance constraints of the 1-Layer Model (Table 4C). The first distance constraint is similar to the first distance constraint of the 1-Layer Model in that it sets the distance value related to each node on the existing network to 0 for each layer. The second constraints sets maximum distance values for each node on each layer. In the 3-Layer Model distance constraints, M is about equal to maximum distance of the ring (e.g., 50 miles), $D^P$ is the maximum protected lateral length (few hundred feet), and $D^U$ is the maximum unprotected lateral length (a few miles). The M and D values may depend on customer requirements of reliability as well as requirements of equipment operating the network. The third, fourth and fifth distance constraints are similar to the second distance constraint of the first model. Here, however, the third constraint is related to the ring layer, the fourth constraint is related to the protected layer, and the fifth constraint is related to the unprotected layer. Therefore, the third constraint uses the M value, the fourth constraint uses the $D^P$ value, and the fifth constraint uses the $D^U$ value.

TABLE 9

3-Layer Model Distance Constraints

| | Distance Constraints | | | Count | Comparison to 1-Layer Model |
|---|---|---|---|---|---|
| 1 | $d_n^R = 0$ | $d_n^P = 0$ | $d_n^U = 0$ | $n \in E$ | Modified |
| 2 | $d_n^R \leq M$ | $d_n^P \leq D^P$ | $d_n^U \leq D^U$ | $n \in N$ | New |
| 3 | $-d_n^R + d_m^R \geq -M + (M + L_{nm})x_{nm}^R$ | | | $\forall(n,m) \in A\|\ m \notin E$ | Modified |
| 4 | $-d_n^P + d_m^P \geq (D^P + L_{nm})x_{nm}^P$ | | | $\forall(n,m) \in A$ | New |
| 5 | $-d_n^U + d_m^U \geq (D^U + L_{nm})x_{nm}^U$ | | | $\forall(n,m) \in A$ | New |

Notes:
The distance limits are independent for each layer, so distance values are tracked separately and are not coupled.
Using the smaller values $D^P$ and $D^U$ in place of M in the last two constraint sets gives a slightly tighter linear relaxation.
A lateral arc can never enter a node in E because of the connectivity constraint $y_n^R = 1\ \forall n \in E$.

Generally speaking, the distance limits are independent for each layer. Therefore, the distance values are tracked separately and are not coupled. In using smaller values for $D^P$ and $D^U$ compared to M, a tighter linear relaxation may be achieved. The distance constraints are effective at limiting the lateral, both protected and unprotected, lengths so that the model delivers feasible solutions. Using an M value only, for example, in place of $D^P$ and $D^U$, would not so limit the protected and unprotected lateral lengths.

Table 10 illustrates service constraints for the 3-Layer Model. The service constraints play a slightly different role in the 3-Layer Model as compared to the 1-Layer Model. Here, there is a z variable for protected services and a z variable for unprotected services. The first constraint indicates that to provide protected services at a customer node z, the node is either on the ring layer or the protected layer. The second constraint indicates that to provide unprotected services, the customer node may be on any of the layers. Finally, the third service constraint requires that a customer mode may be on a protected node or an unprotected node but cannot be both.

TABLE 10

3-Layer Model Service Constraints

| | Service Constraints | Count | Comparison to 1-Layer Model |
|---|---|---|---|
| 1 | $z_n^P \leq y_n^R + y_n^P$ | $\forall n \in C$ | Modified |
| 2 | $z_n^U \leq y_n^R + y_n^P + y_n^U$ | $\forall n \in C$ | Modified |
| 3 | $z_n^P + z_n^U : 1$ | $\forall n \in C$ | Modified |

Notes:
The two service levels now have different connectivity requirements, with the protected service level being stricter than the unprotected.

The delayed cut generation method described above can also be used to help solve the 3-Layer Model described here. In the forward maximum flow problems, we set the capacity of each arc (n,m) to the value of $x_{nm}^R + x_{nm}^P + x_{nm}^U$ in the current solution. For the backward flows, we set them to $x_{mn}^R + x_{mn}^P + x_{mn}^U$.

5-Layer Model with Equipment Costs

While digging up streets and burying fiber is expensive, the equipment used to transmit and receive signals between a central gateway and the individual customers also has a considerable cost. Therefore, it may be helpful to further model the equipment costs because it varies based on the distance between the gateway and customer and other factors. That is, the farther the customer from the gateway, the more expensive the equipment will be. This cost factor can change the optimal design of the fiber routes used to connect customers, as in the diagram below.

In this example, two customers (700, 702) are connected to a gateway 704 by protected connections. That is, they both have two distinct fiber paths (706A, 706B) from the gateway. For the customer 700 on the left, the longer 706A of the two connection paths traverses almost the entire loop 708 to reach it. It is possible that a short fiber path 710 built across the loop as shown could reduce equipment costs for that path by more than its cost, leading to a different optimal solution when equipment costs are modeled.

To model the lengths of the connection paths to customers, the model distinguishes between conduit paths and fiber paths. The ring and lateral layers, both unprotected and protected, presented in the above-described 3-Layer Model will be referred to as conduit layers since they model the cost of digging up the streets to make space for fiber. Thus, the 5-Layer Model includes the three layers of the 3-Layer Model. Once conduits are defined, the paths of the individual fibers contained in the conduits are modeled by two new layers which will be referred to as fiber layers (fiber layer 1 and fiber layer 2).

The use of directed arcs in the previous model is convenient for modeling the fact that the two fiber paths are distinct for each customer with protected service. The 5-Layer Model achieves this by building a tree within each fiber layer with rules specifying the directions the trees may traverse within the conduits. Those rules are as follows:

(1) Fiber layer 1 may use any arc used by a ring or lateral conduit layer in the same direction.
(2) Fiber layer 2 may use any arc used by a ring conduit layer in the reverse direction or a lateral conduit layer in the same direction.

These rules require that when two fiber paths overlap on an arc pair used in the ring layer, the paths must traverse it in opposite directions. This ensures that the two fiber paths to any given particular customer node with protected service do not overlap. If they were to overlap, the service would not be considered "protected" as a cut on the street where they overlap would sever both fiber paths to the customer.

The relationship between distance and cost is a step function based on the cost and range of the available equipment types. For example, line cards with different ranges may come with increasing costs depending on the range of the card. The 5-Layer Model defines a set T of available equipment options. For each type t∈T, $Q_t$ is the cost of using equipment type t, including both gateway and customer side equipment for both transmit and receive directions, and $R_t$ is the range of equipment type t. The 5-Layer integer program is then formulated as follows.

Table 11 illustrates the parameters for the 5-Layer Model. The first six parameters are unchanged from the 3-Layer Model. The 5-Layer Model, however, includes three new parameters.

TABLE 11

5-Layer Model Parameters

| | Parameters | Count |
|---|---|---|
| 1 | $P_n^l$ = prize value of providing level l service to potential customer node n. This value can be set to zero if the customer will not buy at level l. | $\forall l \in \{P, U\}$, $n \in C$ |
| 2 | $C_{nr}$ = cost of laying fiber on the street represented by (n, m) | $\forall (n, m) \in A$ |
| 3 | $L_{nr}$ = physical length of the street represented by (n, m) | $\forall (n, m) \in A$ |
| 4 | M = a large number used in the routing constraints | |
| 5 | $D^P$ = maximum length of a protected lateral | |
| 6 | $D^U$ = maximum length of an unprotected lateral | |
| 7 | $G_n^l$ distance from node n to chosen gateway in direction l along existing fiber | $\forall l \in \{1, 2\}$, $n \in E$ |
| 8 | $Q_t$ = cost of using equipment type t to build a customer connection (includes gateway and customer side, transmit and receive) | $\forall t \in T$ |
| 9 | $R_t$ = range of equipment type t | $\forall t \in T$ |

Particularly, the 5-Layer Model includes $G_n^l$, $Q_t$, and $R_t$ parameters not found in the 3-Layer Model. The $G_n^l$ parameter defines the distance from a node to a chosen gateway along a particular fiber and direction. The G variable accounts for the distance along existing fiber from a gateway to the new network. The distance variables, discussed below, involve distances along the new fiber to a particular node. Thus, the 5-Layer Model accounts for the overall distance from a gateway to a given node n. Overall, the distance variables play a role in preventing cycles as well as establishing costs for laying fiber to a customer location as well as providing the networking equipment to provision service to the customer. In many instances and in order to collect the protected service prize for a customer node, the model will generate a fiber path 1 and a fiber path 2 to the customer node, and there will also be the appropriate set of equipment to provision service to the customer node along each path to the customer. In contrast, for unprotected service, it is only necessary to have equipment along one path to the customer node. The $Q_t$ parameter defines the cost of using a particular type of equipment for a customer connection. Finally, the $R_t$ parameter defines the range for a particular type of equipment.

TABLE 12

5-Layer Model Variables

| | Variables | Count | Domain |
|---|---|---|---|
| 1 | $x_{nm}^l = \begin{cases} 1 \text{ if arc (n, m) on will be used on layer l} \\ 0 \text{ otherwise} \end{cases}$ | $\forall l \in \{R, P, U, 1, 2\}$, $(n, m) \in A$ | binary |
| 2 | $y_n^l = \begin{cases} 1 \text{ if node n will be connected on layer l} \\ 0 \text{ otherwise} \end{cases}$ | $\forall l \in \{R, P, U, 1, 2\}$, $n \in N$ | binary |
| 3 | $z_n^l = \begin{cases} 1 \text{ if potential customer node n meets all criteria} \\ \quad \text{for and will be connected with service level l} \\ 0 \text{ otherwise} \end{cases}$ | $\forall l \in \{P, U\}, n \in C$ | binary |
| 4 | $d_n^l$ = distance from the "beginning" of a directed arc path to node n on layer l | $\forall l \in \{R, P, U, 1, 2\}$, $n \in N$ | continuous |
| 5 | $q_{n,t}^l = \begin{cases} 1 \text{ if potential customer node n will use equipment type t to connect on layer l} \\ 0 \text{ otherwise} \end{cases}$ | $\forall l \in \{1, 2\}, n \in C$ | binary |

The variables types for the 5-Layer Model are substantially the same as the 3-Layer Model with the addition of the variable type $q_{n,t}^l$. This variable associates a potential customer node with a type of equipment and the layer l upon which it might be connected. So, for each q variable, there may be unique Q and R parameters. For example, if there are four possible equipment types for a line card, then there may be four costs Q for each equipment type, and an associated range R for each equipment type. In the case of line cards, the cost may be $5000, $10,000, $15,000 and $20,000 and the range for the types of line card may be 2000 meters, 40,000 meters, 80,000 meters and 120,000 meters, respectively. The 5-Layer Model, for this example, would be configured to account for these various costs and associated ranges for identified types of equipment.

The following is the objective function for the 5-Layer Model. The summation accounts for substantially the same variables and parameters as the 3-Layer Model, with appropriate modifications to account for the additional two layers, and also includes a provision to account for the cost of using equipment to connect a customer node.

Objective $$\text{Maximize} \sum_{n \in C} (P_n^P z_n^P + P_n^U z_n^U) - \sum_{(n,m) \in A} (C_{nm} x_{nm}^R + 2 C_{nm} x_{nm}^P + C_{nm} x_{nm}^U) - \sum_{\ell \in \{1,2\}} \sum_{n \in C} \sum_{t \in T} Q_t q_{n,t}^\ell$$

Table 13 illustrates the connectivity constraints for the 5-Layer Model, which are substantially similar to the connectivity constraints for the 3-Layer Model with appropriate changes. Here, additional constraints eight and nine are added and address the specific connectivity requirements of the additional two fiber layers, which are similar to those of the ring layer but without the arc-outflow requirement (constraint four).

TABLE 13

5-Layer Model Connectivity Constraints

| | Connectivity Constraints | Count |
|---|---|---|
| 1 | $y_n^R = 1 \quad y_n^P = 0 \quad y_n^U = 0 \quad y_n^1 = 1 \quad y_n^2 = 1$ | $\forall n \in E$ |
| 2 | $\sum_{(n,m) \in \delta^+(m)} x_{nm}^l \geq y_m^l$ | $\forall l \in \{R, P, U, 1, 2\}$, $m \in N/E$ |
| 3 | $x_{nm}^l \leq y_m^l$ | $\forall l \in \{R, P, U, 1, 2\}$, $(n, m) \in A$ |
| 4 | $y_n^R \leq \sum_{(n,m) \in \delta^-(n)} x_{nm}^R$ | $\forall n \in N/E$ (layer R only) |
| 5 | $y_n^R \geq x_{nm}^R$ | $\forall (n, m) \in A$ |
| 6 | $y_n^R + y_n^P \geq x_{nm}^P$ | $\forall (n, m) \in A$ |
| 7 | $y_n^R + y_n^P + y_n^U \geq x_{nm}^U$ | $\forall (n, m) \in A$ |
| 8 | $y_n^1 \geq x_{nm}^1$ | $\forall (n, m) \in A$ |
| 9 | $y_n^2 \geq x_{nm}^2$ | $\forall (n, m) \in A$ |

Table 14 illustrates the saturation constraints for the 5-Layer Model. The first two constraints are substantially similar to the saturation constraints of the 3-Layer Model. The third and fourth constraints are new and indicate that a path 1 can only use forward ring and lateral arcs, and a connection path 2 can only use a reverse ring arc and a forward lateral arc. This ensures that the pair of the fiber paths leading to any particular customer node do not overlap on the ring layer.

TABLE 14

5-Layer Model Saturation Constraints

| | Saturation Constraints | Count |
|---|---|---|
| 1 | $y_n^R + y_n^P + y_n^U \leq 1$ | $\forall n \in N$ |
| 2 | $x_{nm}^R + x_{mn}^R + x_{nm}^P + x_{mn}^P + x_{nm}^U + x_{mn}^U \leq 1$ | $\forall (n, m) \in A$ |
| 3 | $x_{nm}^1 \leq x_{mn}^R + x_{nm}^P + x_{nm}^U$ | $\forall (n, m) \in A$ |
| 4 | $x_{nm}^2 \leq x_{mn}^R + x_{nm}^P + x_{nm}^U$ | $\forall (n, m) \in A$ |

Notes:
Connection path 1 can use only forward ring arc and forward lateral arcs.
Connection path 2 can use only reverse ring arcs and forward lateral arcs.

Table 15 illustrates the distance constraints for the 5-Layer Model. The first five distance constraints are substantially unchanged from the 3-Layer model with the exception of new distance constraints being added in the first two constraints to account for the new fiber layers 1 and 2. Additionally, the 5-Layer Model includes four new constraints, distance constraints six through nine.

With respect to the sixth and seventh constraint, $R_{Max}$ is the maximum range of any type of equipment that might be used. These constraints help to make sure that each additional arc added to a path includes the additional distance for the path.

TABLE 15

5-Layer Model Distance Constraints

| | Distance Constraints | | | | | Count |
|---|---|---|---|---|---|---|
| 1 | $d_n^R = 0$ | $d_n^P = 0$ | $d_n^U = 0$ | $d_n^1 = G_n^1$ | $d_n^2 = G_n^2$ | $\forall n \in E$ |
| 2 | $d_n^R \leq M$ | $d_n^P \leq D^P$ | $d_n^U \leq D^U$ | $d_n^1 \leq R_{max}$ | $d_n^2 \leq R_{max}$ | $\forall n \in N$ |
| 3 | $-d_n^R + d_m^R \geq -M + (M + L_{nm}) x_{nm}^R$ | | | | | $\forall (n, m) \in A \mid m \notin E$ |
| 4 | $-d_n^P + d_m^P \geq -D^P + (D^P + L_{nm}) x_{nm}^P$ | | | | | $\forall (n, m) \in A$ |
| 5 | $-d_n^U + d_m^U \geq -D^U + (D^U + L_{nm}) x_{nm}^U$ | | | | | $\forall (n, m) \in A$ |
| 6 | $-d_n^1 + d_m^1 \geq -R_{max} + (R_{max} + L_{nm}) x_{nm}^1$ | | | | | $\forall (n, m) \in A$ |
| 7 | $-d_n^2 + d_m^2 \geq -R_{max} + (R_{max} + L_{nm}) x_{nm}^2$ | | | | | $\forall (n, m) \in A$ |
| 8 | $d_n^1 \leq R_t + (1 - q_{n,t}^1) M$ | | | | | $\forall n \in C, t \in T$ |
| 9 | $d_n^2 \leq R_t + (1 - q_{n,t}^2) M$ | | | | | $\forall n \in C, t \in T$ |

Notes:
$R_{max}$ refers to the maximum reach of any equipment type.
The last two constraint sets require the distance of the connection path to be at most the range of the equipment type used.

With respect to the eighth and ninth constraint, when M is set to a relatively large number, such as M=2000, then when q is 0, the distance constraints for fibers layers 1 and 2 becomes a function of the M value and the range of equipment and therefore d is easy to satisfy. In contrast, when q is 1, the distance constraint for fiber layers 1 and 2 is only a function of the range of the equipment. Thus, q can only equal 1 when the distance constraint for the equipment is met. Stated differently, these distance constraints help ensure that equipment with sufficient range is used in the solution.

The cost of connecting a customer may differ substantially depending on the distance from an existing gateway node, or other point of connection to the existing network.

Table 16 illustrates the service constraints for the 5-Layer Model. Besides the first constraint, which is new, these constraints are similar to those described for the 3-Layer Model. The first saturation constraint requires that there must be a fiber path on a given layer in order to use equipment on that layer.

TABLE 16

| | 5-Layer Model Service Constraints | |
|---|---|---|
| | Service Constraints | Count |
| 1 | $q_{n,t}^l \leq y_n^l$ | $\forall l \in \{1, 2\}, n \in C$ |
| 2 | $z_n^P \leq \sum_{t \in T} q_{n,t}^l$ | $\forall l \in \{1, 2\}, n \in C$ |
| 3 | $z_n^U \leq \sum_{l \in \{1,2\}} \sum_{t \in T} q_{n,t}^l$ | $\forall n \in C$ |

TABLE 16-continued

| | 5-Layer Model Service Constraints | |
|---|---|---|
| | Service Constraints | Count |
| 4 | $z_n^P + z_n^U \leq 1$ | $\forall n \in C$ |

Notes:
Using equipment for connection 1 or 2 requires a fiber path on the respective layer.
Protected service requires both connections 1 <u>and</u> 2, while unprotected service requires either connection 1 <u>or</u> 2.

Finally, we also use the delayed cut generation method described above to help solve the 5-Layer Model. To do so, we compute forward maximum flows only on the fiber layers 1 and 2. The cuts imposed on these layers will also eliminate subtours on the ring and lateral conduit layers.

Dual Path Model

Aspects of the present disclosure may also involve a dual path model substantially similar to the fourth or fifth layer of the 5-Layer Model. This and the previous models may utilize a mixed-integer linear programming model to design communication networks. In particular, embodiments utilizing this Dual Path model can be used to design and optimize new conduit paths (e.g., fiber) to be buried under an existing street network for reaching potential new customers of a communications network (e.g., to maximize net present value of potential customers).

For example, the Dual Path model can be described as a pair of prize-collecting Steiner arborescence problems solved simultaneously using various combinations of coupling constraints and variables. The layer one Steiner tree can represent working circuit paths to potential customers, while layer two can represent protection paths to potential customers. In one example embodiment, each tree is rooted at an existing network node, referred to here as a cable access point (CAP) which is represented by a special subset of the nodes in the street network. Table 17 shows the various elements (e.g., variables, parameters, constraints, etc.) of an example model used to optimize new paths (and maximize NPV) in a network.

TABLE 17

| | | Dual Path Model Parameters | |
|---|---|---|---|
| Domain | Count | | Definition |
| binary | For all layers l and arcs (u, v): | $x_{uv}^l = \begin{cases} 1 & \text{if arc } u \to v \text{ is part of the layer l Steiner tree} \\ 0 & \text{otherwise} \end{cases}$ | |
| binary | For all pairs (u, v) where u < v: | $b_{uv} = \begin{cases} 1 & \text{if arc } u \to v \text{ or } v \to u \text{ is part of a Steiner tree in either} \\ 0 & \text{otherwise} \end{cases}$ | |
| binary | For all layers l and vertices v: | $y_v^l = \begin{cases} 1 & \text{if vertex } v \text{ is part of the layer l Steiner tree} \\ 0 & \text{otherwise} \end{cases}$ | |
| binary | For all vertices v: | $z_v = \begin{cases} 1 & \text{if vertex } v \text{ is part both layers of Steiner trees} \\ 0 & \text{otherwise} \end{cases}$ | |
| continuous | For all layers l and vertices v: | $d_v^l$ = distance from the fixed network to vertex v in the layer l Steiner tree | |

TABLE 18

Dual Path Model Sets

| Count | Definition |
|---|---|
| For all vertices v: | $p_v^1$ = "prize" value of connecting a working path only to a customer vertex |
| For all vertices v: | $p_v^2$ = "prize" value of connecting both a working and protection path to a customer vertex |
| | "prizes" are computed by: |
| | (NPV of customer revenue stream) − (fixed non-fiber connection costs) |
| For all arcs (u, v): | $c_{uv}$ = cost of laying fiber conduit over the path represented by u ↔ v |
| For all arcs (u, v): | $L_{uv}$ = physical length of the path represented by u ↔ v |
| | M = maximum length of any customer connection path |

Sets
  $\delta^+(v)$=set of arcs with head at vertex v
  $\delta^-(v)$=set of arcs with tail at vertex v
  CAPs=the set of cable access point vertices
  Customers=the set of customer vertices
Dual Path Model Objective Function:

$$\text{Maximize} \sum_v (p_v^1 y_v^1 + p_v^2 z_v) - \sum_{u<v} c_{uv} b_{uv}$$

TABLE 19

Dual Path Model Constraints

Tree constraints:

| | |
|---|---|
| For all layers l and all vertices v where v ∉ CAPs: | $= y_v^l \sum_{(u,v)\in \delta^+(v)} x_{uv}^l$ |
| For all layers l, all vertices v and all arcs (v, w) ∈ $\delta^-$ (v): | $y_v^l \geq x_{vw}^l$ |
| For all layers l, and all vertices v where v ∉ Customers: | $\leq \sum_{(v,w)\in \delta^-(v)} \frac{y_v^l}{x_{vw}^l}$ |

TABLE 20

Dual Path Model Distance Constraints

Distance constraints:

| | |
|---|---|
| For all layers l, and all vertices v: where v ∈ CAPs | $d_v^l = 0$ |
| For all layers l, and all arcs (u, v): | $-d_u^l + d_v^l \geq -M + (L_{uv} + M)x_{uv}^l$ |

TABLE 21

Dual Path Model Coupling Constraints

Coupling constraints:

| | |
|---|---|
| For all layers l and all arcs (u, v): | $x_{uv}^1 + x_{uv}^2 \leq 1$ |
| For all layers l, and all pairs(u, v): where u < v | $x_{uv}^l + x_{vu}^l \leq b_{uv}$ |
| For all layers l and all vertices v: | $z_v \leq y_v^l$ |

In the example model shown in Table 21 above, the coupling constraints require that no pair of arcs (i.e., an arc being a path segment between two vertices/nodes) between the same pair of vertices may be simultaneously active if those arcs reside in the same layer or point in the same direction. However, a pair of arcs between the same pair of vertices may be simultaneously active if those arcs are in different layers and point in opposite directions. This constraint is implemented because such an occurrence cannot prevent the existence of two arc-disjoint paths for any customer vertex connected to both trees, similar to the diverse routing algorithms described in Bhandari[1].

[1]Bhandari, Ramesh. *Survivable Networks: Algorithms for Diverse Routing.* London: Kluwer Academic Publishers, 1999. (incorporated by reference in its entirety)

Although the distance variables and constraints in the example model prevent the existence of disconnected cycles in the solution, they have a very weak linear relaxation. Thus, such distance variable and constraints are typically not relied upon to generate optimal solutions within a reasonable time. As such, the model is solved using delayed cut generation in this example configuration.

According to an example embodiment, at each node of the branch-and-cut solution tree, a maximum flow is computed using the augmenting path algorithm from the CAP vertices to each customer vertex in each layer l, using the $x_{uv}^l$ values in the relaxed solution as arc capacities. For example, if the maximum flow is less than $y_v^l$, the minimum graph cut (S,T) that separates the CAPs (in S) from the customer vertex (in T) is found and, thus, the following integer programming cut is added[2]:

$$y_v^\ell \leq \sum_{s\in S, s\in T} x_{st}^\ell$$

[2]*An Algorithmic Framework for the Exact Solution of the Prize-Collecting Steiner Tree Problem.* Ljubic, Ivana, et al. 2-3, 2006, Mathematical Programming, Vol. 105, pp. 427-449. (incorporated by reference in its entirety)

Figure 4:
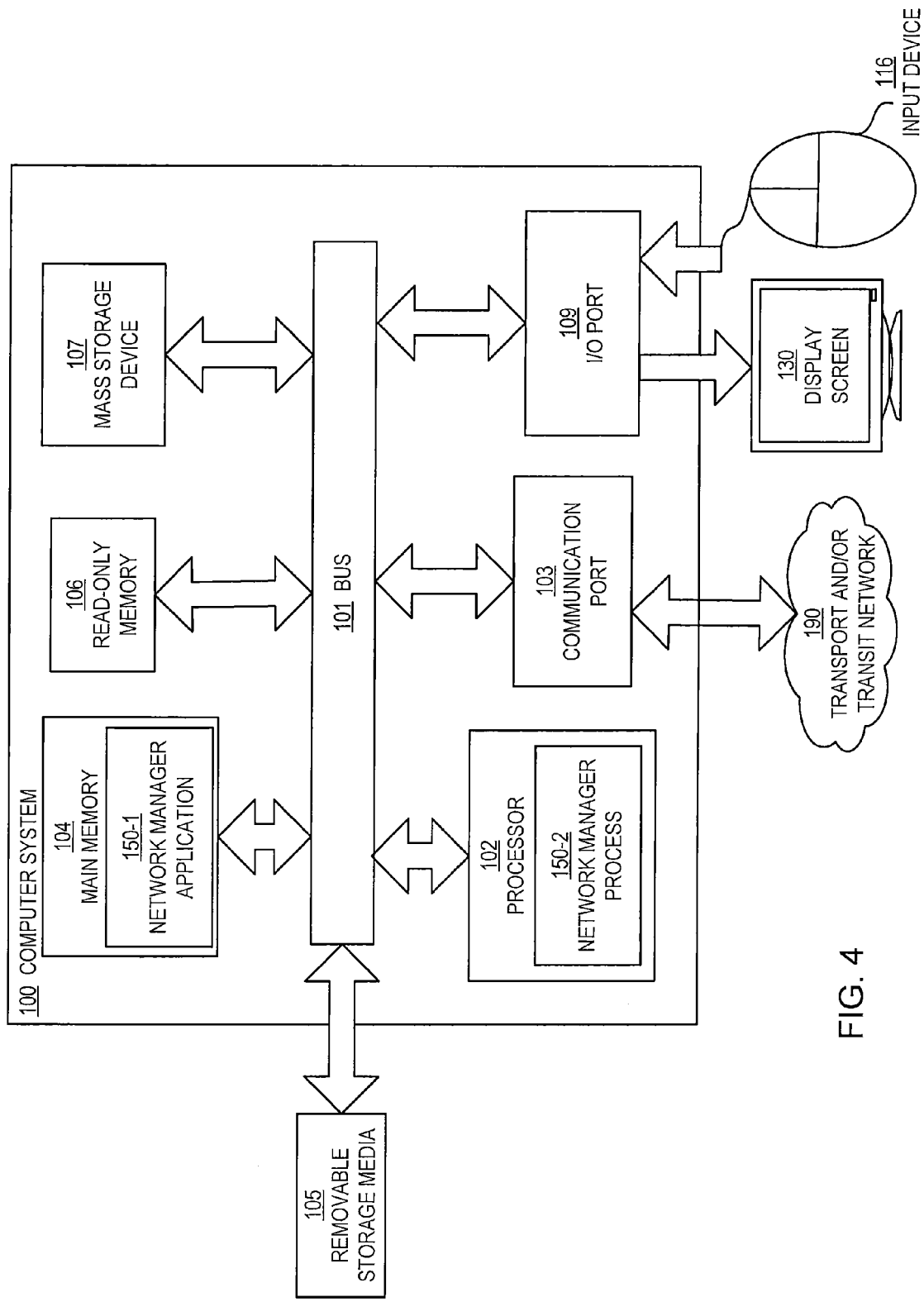
FIG. 4 is a block diagram of a computer system suitable for performing network design and optimization in accordance with an example embodiment.

FIG. 4 is a schematic diagram of a computer system 100 upon which the various embodiments of the present disclosure may be carried out and implemented. For example, one or more computing devices 100 may be used to design, optimize, etc. network paths and configurations.

According to the present example, the computer system 100 includes a bus 101 (i.e., interconnect), at least one processor 102, at least one communications port 103, a main memory 104, a removable storage media 105, a read-only memory 106, and a mass storage 107. Processor(s) 102 can be any known processor, such as, but not limited to, an Intel® Itanium® or Itanium 2® processor(s), AMD® Opteron® or Athlon MP® processor(s), or Motorola® lines of processors. Communications ports 103 can be any of an RS-232 port for use with a modem based dial-up connection, a 10/100 Ethernet port, a Gigabit port using copper or fiber, or a USB port. Communications port(s) 103 may be chosen depending on a network such as a Local Area Network (LAN), a Wide Area Network (WAN), or any network to which the computer system 100 connects. The computer system 100 may be in communication with peripheral devices (e.g., display screen 130, input device 116) via Input/Output (I/O) port 109.

Main memory 104 can be Random Access Memory (RAM), or any other dynamic storage device(s) commonly known in the art. Read-only memory 106 can be any static storage device(s) such as Programmable Read-Only Memory (PROM) chips for storing static information such as instructions for processor 102. Mass storage 107 can be used to store information and instructions. For example, hard disks such as the Adaptec® family of Small Computer Serial Interface (SCSI) drives, an optical disc, an array of disks such as Redundant Array of Independent Disks (RAID), such as the Adaptec® family of RAID drives, or any other mass storage devices may be used.

Bus 101 communicatively couples processor(s) 102 with the other memory, storage and communications blocks. Bus 101 can be a PCI/PCI-X, SCSI, or Universal Serial Bus (USB) based system bus (or other) depending on the storage devices used. Removable storage media 105 can be any kind of external hard-drives, floppy drives, IOMEGA® Zip Drives, Compact Disc-Read Only Memory (CD-ROM), Compact Disc-Re-Writable (CD-RW), Digital Video Disk-Read. Only Memory (DVD-ROM), etc.

Embodiments herein may be provided as a computer program product, which may include a machine-readable medium having stored thereon instructions, which may be used to program a computer (or other electronic devices) to perform a process. The machine-readable medium may include, but is not limited to, floppy diskettes, optical discs, CD-ROMs, magneto-optical disks, ROMs, RAMs, erasable programmable read-only memories (EPROMs), electrically erasable programmable read-only memories (EEPROMs), magnetic or optical cards, flash memory, or other type of media/machine-readable medium suitable for storing electronic instructions. Moreover, embodiments herein may also be downloaded as a computer program product, wherein the program may be transferred from a remote computer to a requesting computer by way of data signals embodied in a carrier wave or other propagation medium via a communication link (e.g., modem or network connection).

As shown, main memory 104 is encoded with network optimizer application 150-1 that supports functionality as discussed herein. More particularly, the network optimizer may execute a linear programming application configured to run the objective functions in consideration of the parameters, variables, constraints and otherwise to define a network extension of an existing network, which both may involve optical fiber and associated hardware, to provide service to some set of new customers. Network optimizer application 150-1 (and/or other resources as described herein) can be embodied as software code such as data and/or logic instructions (e.g., code stored in the memory or on another computer readable medium such as a disk) that supports processing functionality according to different embodiments described herein. During operation of one embodiment, processor(s) 102 accesses main memory 104 via the use of bus 101 in order to launch, run, execute, interpret or otherwise perform the logic instructions of the network optimizer application 150-1. Execution of network optimizer application 150-1 produces processing functionality in network optimizer process 150-2. In other words, the network optimizer process 150-2 represents one or more portions of the network optimizer application 150-1 performing within or upon the processor(s) 102 in the computer system 100.

It should be noted that, in addition to the network optimizer process 150-2 that carries out method operations as discussed herein, other embodiments herein include the network optimizer application 150-1 itself (i.e., the un-executed or non-performing logic instructions and/or data). The network optimizer application 150-1 may be stored on a computer readable medium (e.g., a repository) such as a floppy disk, hard disk or in an optical medium. According to other embodiments, the network optimizer application 150-1 can also be stored in a memory type system such as in firmware, read only memory (ROM), or, as in this example, as executable code within the main memory 104 (e.g., within Random Access Memory or RAM). For example, network optimizer application 150-1 may also be stored in removable storage media 105, read-only memory 106, and/or mass storage device 107.

As discussed herein, embodiments of the present invention include various steps or operations. A variety of these steps may be performed by hardware components or may be embodied in machine-executable instructions, which may be used to cause a general-purpose or special-purpose processor programmed with the instructions to perform the operations. Alternatively, the steps may be performed by a combination of hardware, software, and/or firmware.

Figure 5:
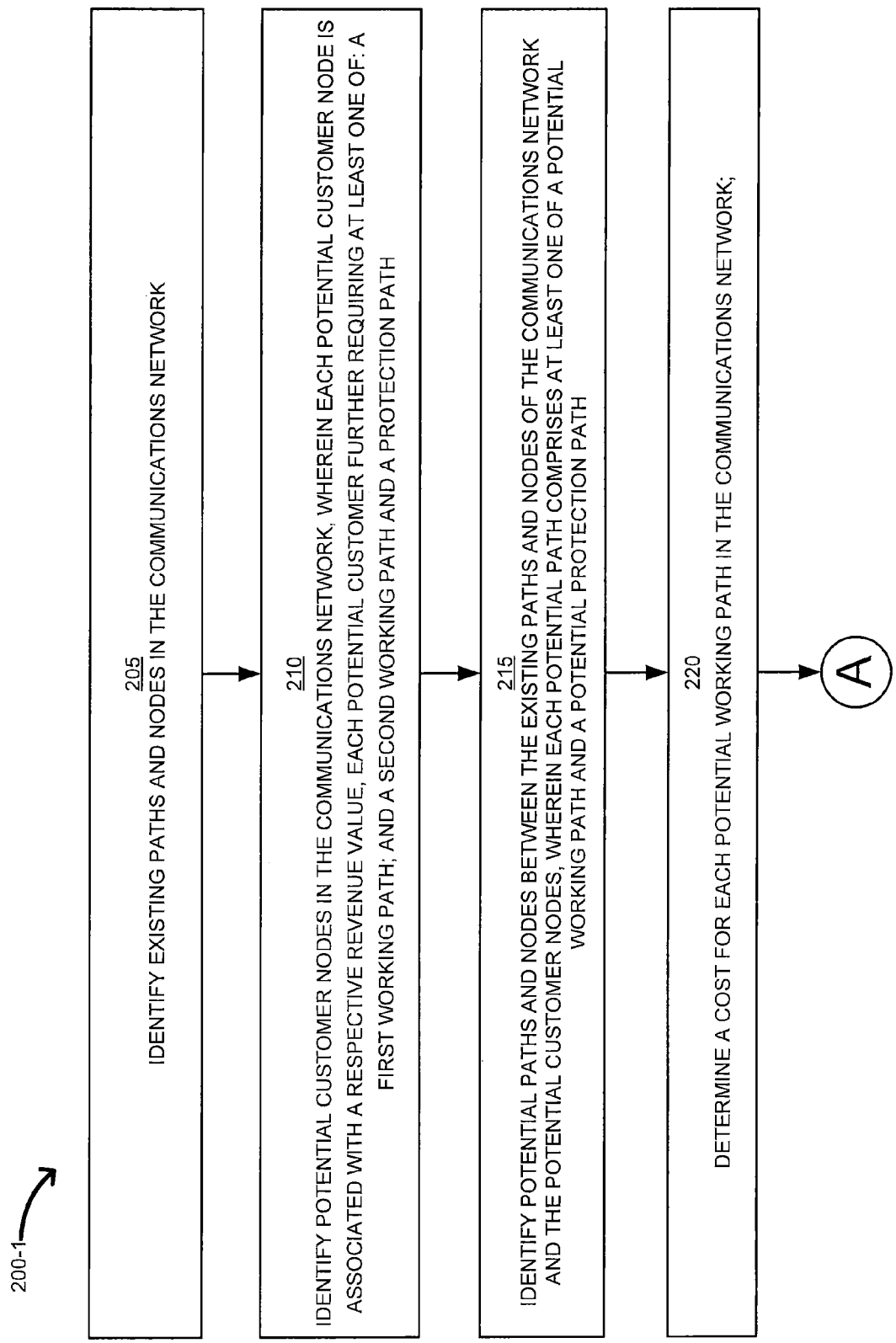
FIG. 5 is a flow chart that shows processing operations performed by a network optimizer in accordance with an example embodiment.
Figure 6:
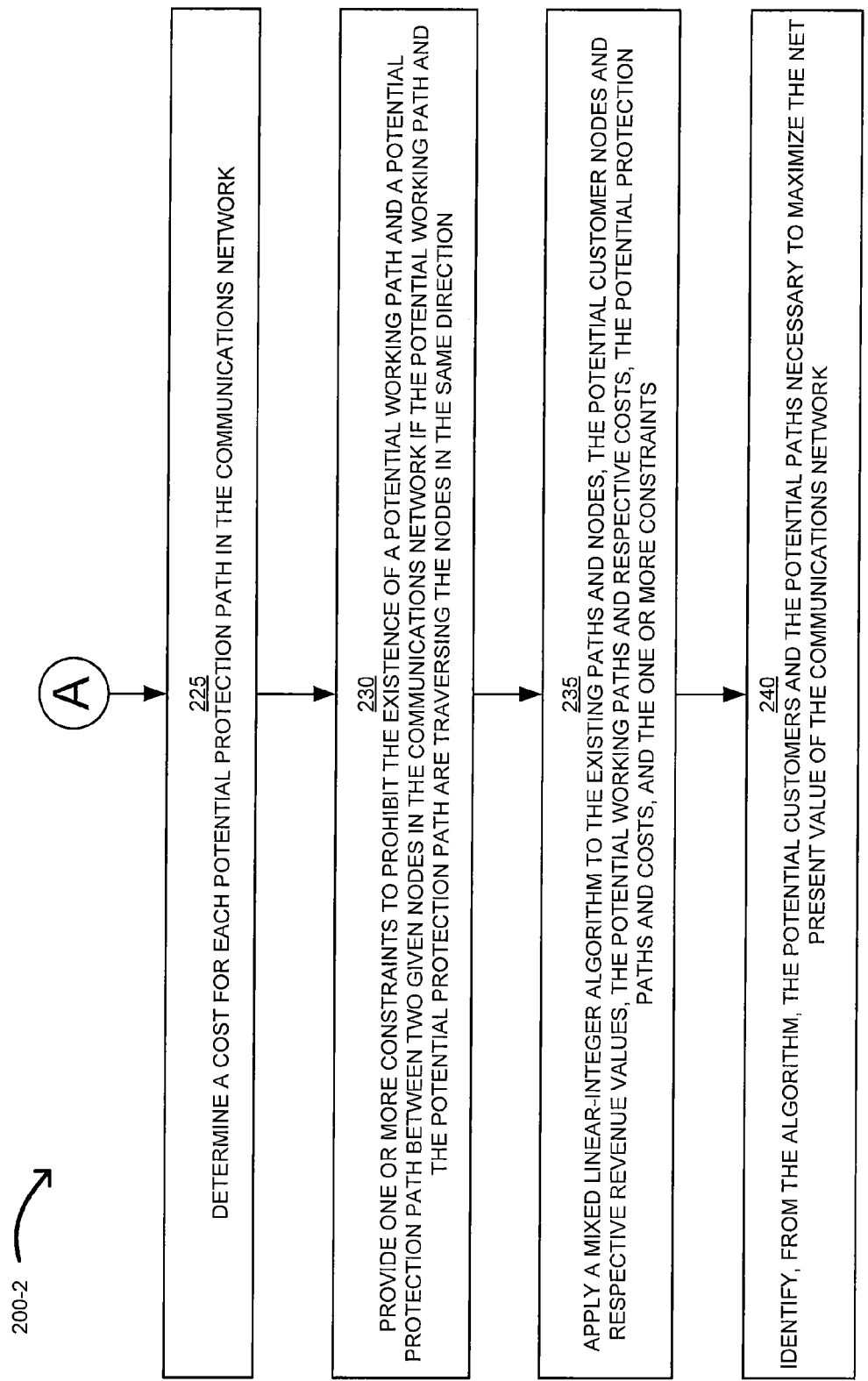
FIG. 6 is a flow chart that shows processing operations performed by a network optimizer in accordance with an example embodiment.
Figure 7:
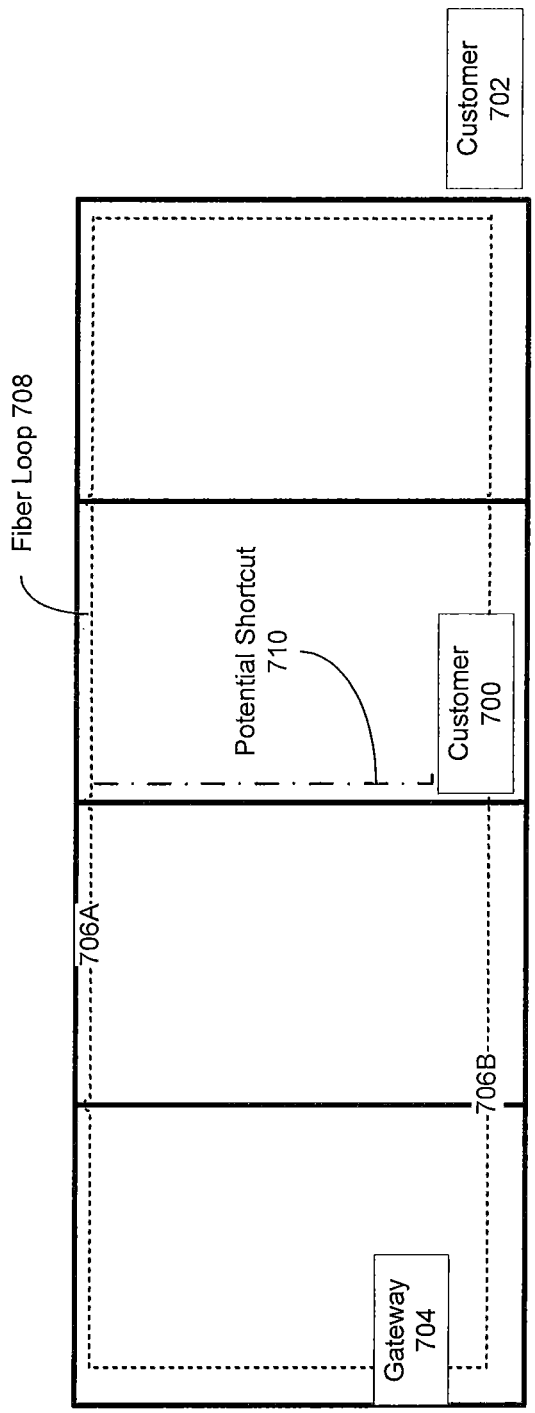
FIG. 7 is a diagram illustrating an existing fiber loop providing redundant paths between a gateway and two customers, and a potential path that may reduce overall equipment costs when processed in a 5-layer model.

FIGS. 5 and 6 include a flowchart according to embodiments herein. The rectangular elements are herein denoted as "steps" and represent computer software instructions or groups of instructions that carry out such functions. The flow diagrams do not necessarily depict the syntax of any particular programming language. Rather, the flow diagrams illustrate the functional information one of ordinary skill in the art could use to fabricate circuits or to generate computer software (or a hybrid of both circuits and software code) to carry out the features as described herein.

It should be noted that many routine program elements, such as initialization of loops and variables and the use of temporary variables are inherent in the flowcharts. It will be appreciated by those of ordinary skill in the art that unless otherwise indicated herein, the particular sequence of steps described is illustrative only and can be varied without departing from the spirit of the invention. Thus, unless otherwise stated the steps described below are unordered meaning that, when possible, the steps can be performed in any convenient or desirable order.

Now, more specifically, FIGS. 5 and 6 show a flow chart 500 (i.e., flowcharts 500-1 and 200-2) of processing steps representing processing operations performed by the network optimizer 150 (i.e., network optimizer application 150-1 and/or the run-time implementation of network optimizer process 150-2) in accordance with one example embodiment.

In step 205, the network optimizer 150 identifies existing paths and nodes in a communications network.

In step 210, the network optimizer 150 identifies potential customer nodes in the communications network. In one embodiment, each potential customer node is associated with a respective revenue value (or some similar financial incentive). Each customer node may be associated with a ring, path, a protected path, and unprotected path, a first fiber layer and/or a second fiber layer. Furthermore, each potential customer may require at least one of: i) a first working path; or, ii) a second working path and a protection path.

In step 220, the network optimizer 150 identifies potential paths and nodes between the existing paths and nodes of the communications network and the potential customer nodes. In another example, in one embodiment each potential path comprises at least one of a potential working path and a potential protection path.

In step 225, the network optimizer 150 determines a respective cost for each potential path in the communications network. The network optimizer may consider the cost of laying fiber as well as the cost of network equipment.

In step 230, the network optimizer 150 provides one or more constraints to prohibit the existence of a potential working path and a potential protection path between two given nodes in the communications network if the potential working path and the potential protection path are traversing the nodes in the same direction.

In step 235, the network optimizer 150 applies a mixed linear-integer algorithm (or similar computational means) to the existing paths and nodes, the potential customer nodes and respective revenue values, the potential working paths and respective costs, the potential protection paths and costs, and the one or more constraints.

In step 240, the network optimizer 150 identifies, from the algorithm, the potential customers and the potential paths necessary to maximize the net present value of the communications network.

In another example embodiment, the mixed linear-integer algorithm is executed on a computer. Furthermore, the network optimizer 150 can render, on a graphical user interface (e.g., via display screen 130), an indication of the potential customers and the potential paths necessary to maximize the net present value of the communications network.

Although the present invention has been described with reference to various embodiments, it will be understood that the invention is not limited to the details thereof. Various modifications and substitutions will occur to those of ordinary skill in the art. All such substitutions are intended to be embraced within the scope of the invention as defined in the appended claims.

APPENDIX

Here is a guide to the mathematical notation used in this document for those not familiar.

| Symbol | Definition |
| --- | --- |
| $\in$ | "in" or "is an element of", used to describe set membership |
| $\notin$ | "not in" or "is not an element of" |
| $\forall$ | "for all" |
| / | "excluding" |
| \| | "such that" |

| Example | Translation |
| --- | --- |
| $\forall n \in N/E$ | "for all n in N excluding E", i.e. "for all [elements] n in [the set] N excluding [those also in the set] E" |
| $\forall (n, m) \in A$ | "for all [pairs] (n, m) in [the set] A" |
| $\forall (n, m) \in A \mid m \notin E$ | "for all [pairs] (n, m) in [the set] A such that m is not in [the set] E" |
| $\forall l \in \{L, P, U\}, n \in N$ | "for all [combinations of] l in $\{L, P, U\}$ and n in N" |

The invention claimed is:

1. A method for optimizing a communication network configuration comprising:

identifying, using at least one processor, a plurality of arc paths and a plurality of nodes of a potential extension of an existing communication network sufficient to connect at least one potential customer location to the existing communication network, the at least one potential customer location associated with a value for connecting the at least one potential customer location to the existing communication network, the existing communication network comprising at least a first node and a second node interconnected by at least one existing communication path;

executing, using the at least one processor, a linear programming application to optimize a summation of the value of connecting each of the at least one potential customer locations less a cost of connecting each of the at least one potential customer locations using a combination of the plurality of arc paths beginning at the first node of the existing communication network and ending at the second node of the existing communication network, the linear programming application receiving as inputs at least one parameter, at least one variable, and a plurality of constraints including at least one connectivity constraint, at least one saturation constraint, at least one service constraint, and at least one distance constraint, the at least one distance constraint causing the combination of arc paths to not form an isolated loop; and delivering using the at least one processor a solution including at least one path from the first node to the at least one potential location and to the second node.

2. The method of claim 1 further comprising:

providing for at least three different types of connection paths to the at least one customer location, the types of connection paths comprising a ring path, a protected lateral path, and an unprotected lateral path;

the value of connecting the at least one potential customer location including one or more values accounting for whether the path is the ring path the protected lateral path or the unprotected lateral path; and the at least one distance constraint including at least a first distance constraint associated with the ring path and establishing about a maximum distance for the ring path, a second distance constraint associated with the protected lateral path and establishing about a maximum distance for the protected lateral path, and a third distance constraint associated with the unprotected lateral path and establishing about a maximum distance for the unprotected lateral path.

3. The method of claim 2 wherein the cost of connecting each of the at least one potential customer locations includes at least one equipment type for connecting the at least one potential customer to the existing network and the at least one distance constraint accounts for a range of the at least one equipment type such that a path for connecting the at least one potential customer to the existing network does not exceed the range of the at least one equipment type.

4. The method of claim 1 wherein:

the summation of the value of connecting each of the at least one customer locations less a cost of connecting each of the at least one location comprises:

Objective $$\text{Maximize} \sum_{n \in C} P_n z_n - \sum_{(n,m) \in A} C_{nm} x_{nm}$$

and further wherein:

the at least one parameter comprises:

Parameters $P_n$ = "prize" value of connecting a potential customer node n $C_{nm}$ = cost of laying fiber on the street represented by (n, m)

$L_{nm}$ = physical length of the street represented by (n, m)

M = a large number used in the routing constraints the at least one variable comprises:

| Variables | | Count | Domain |
|---|---|---|---|
| $x_{nm} = \begin{cases} 1 \text{ if fiber will be buried along arc } (n, m) \\ 0 \text{ otherwise} \end{cases}$ | | $\forall (n, m) \in A$ | binary |
| $y_n = \begin{cases} 1 \text{ if node n will be connected to the fiber network} \\ 0 \text{ otherwise} \end{cases}$ | | $\forall n \in N$ | binary |
| $z_n = \begin{cases} 1 \text{ if potential customer node n meets all} \\ \quad \text{service criteria for collecting its "prize"} \\ 0 \text{ otherwise} \end{cases}$ | | $\forall n \in C$ | binary |
| $d_n$ = lower bound on distance from the existing network to node n along a directed fiber path | | $\forall n \in N$ | continuous | the at least one connectivity constraint comprises:

| Connectivity Constraints | Count |
|---|---|
| $y_n = 1$ | $\forall n \in E$ |
| $\sum_{(n,m) \in \delta^+(m)} x_{nm} \geq y_m$ | $\forall m \in N/E$ |
| $x_{nm} \leq y_m$ | $\forall (n, m) \in A$ |
| $y_n \leq \sum_{(n,m) \in \delta^-(n)} x_{nm}$ | $\forall n \in N/E$ |
| $y_n \geq x_{nm}$ | $\forall (n, m) \in A$ | the at least one saturation constraint comprises:

| Saturation Constraints | Count |
|---|---|
| $x_{nm} + x_{mn} \leq 1$ | $\forall (n, m) \in A$ | the at least one distance constraint comprises:

| Distance Constraints | Count |
|---|---|
| $d_n = 0$ | $\forall n \in E$ |
| $-d_n + d_m \geq -M + (M + L_{nm}) x_{nm}$ | $\forall (n, m) \in A \mid m \notin E$; | and
the at least one service constraint comprises:

| Service Constraints | Count |
|---|---|
| $z_n^P \leq y_n^R + y_n^P$ | $\forall n \in C$ |
| $z_n^U \leq y_n^R + y_n^P + y_n^U$ | $\forall n \in C$ |
| $z_n^P + z_n^U \leq 1$ | $\forall n \in C$. |

5. The method of claim 2 wherein:

the linear programming application optimizes the summation of:

Objective $$\text{Maximize} \sum_{n \in C} (P_n^P z_n^P + P_n^U z_n^U) - \sum_{(n,m) \in A} (C_{nm} x_{nm}^L + 2 C_{nm} x_{nm}^P + C_{nm} x_{nm}^U)$$

and further wherein:

the at least one parameter comprises:

| Parameters | Count |
|---|---|
| $P_n^l$: "prize" value of providing a level l service to the potential customer node n. | $\forall l \in \{P, U\}, n \in C$ |
| $C_{nm}$: cost of laying fiber on a street represented by (n, m) | $\forall (n, m) \in A$ |
| $L_{nm}$: physical length of the street represented by (n, m) | $\forall (n, m) \in A$ |
| M: a large number used in the routing constraints | |
| $D^P$: maximum length of the protected lateral | |
| $D^U$: maximum length of the unprotected lateral | | the at least one variable comprises:

| Variables | | Count | Domain |
|---|---|---|---|
| $x_{nm}^l = \begin{cases} 1 \text{ if fiber will be buried along arc } (n, m) \text{ on layer l} \\ 0 \text{ otherwise} \end{cases}$ | | $\forall l \in \{R, P, U\}, (n, m) \in A$ | binary |
| $y_n^l = \begin{cases} 1 \text{ if node n will be connected on layer l} \\ 0 \text{ otherwise} \end{cases}$ | | $\forall l \in \{R, P, U\}, n \in N$ | binary |
| $z_n^l = \begin{cases} 1 \text{ if potential customer node n meets all criteria for} \\ \quad \text{and will be connected with service level l} \\ 0 \text{ otherwise} \end{cases}$ | | $\forall l \in \{P, U\}, n \in C$ | binary |
| $d_n^l$ = distance from the "beginning" of a directed arc path to node n on layer l | | $\forall l \in \{R, P, U\}, n \in N$ | continuous | the at least one connectivity constraint comprises:

| Connectivity Constraints | Count |
|---|---|
| $y_n^R = 1 \quad y_n^P = 0 \quad y_n^U = 0$ | $\forall n \in E$ |
| $\sum_{(n,m)\in\delta^+(m)} x_{nm}^l \geq y_m^l$ | $\forall l \in \{R, P, U\}, m \in N/E$ |
| $x_{nm}^l \leq y_m^l$ | $\forall l \in \{R, P, U\}, (n, m) \in A$ |
| $y_n^R \leq \sum_{(n,m)\in\delta^-(n)} x_{nm}^R$ | $\forall n \in N/E$ (layer R only) |
| $y_n^R \geq x_{nm}^R$ | $\forall (n, m) \in A$ |
| $y_n^R + y_n^P \geq x_{nm}^P$ | $\forall (n, m) \in A$ |
| $y_n^R + y_n^P + y_n^U \geq x_{nm}^U$ | $\forall (n, m) \in A$ | the at least one saturation constraint comprises:

| Saturation Constraints | Count |
|---|---|
| $y_n^R + y_n^P + y_n^U \leq 1$ | $\forall n \in N$ |
| $x_{nm}^R + x_{mn}^R + x_{nm}^P + x_{mn}^P + x_{nm}^U + x_{mn}^U \leq 1$ | $\forall (n, m) \in A$ | the at least one distance constraint comprises:

| Distance Constraints | Count |
|---|---|
| $d_n^R = 0 \quad d_n^P = 0 \quad d_n^U = 0$ | $n \in E$ |
| $d_n^R \leq M \quad d_n^P \leq D^P \quad d_n^U \leq D^U$ | $n \in N$ |
| $-d_n^R + d_m^R \geq -M + (M + L_{nm})x_{nm}^R$ | $\forall (n,m) \in A \| m \notin E$ |
| $-d_n^P + d_m^P \geq -D^P + (D^P + L_{nm})x_{nm}^P$ | $\forall (n,m) \in A$ |
| $-d_n^U + d_m^U \geq -D^U + (D^U + L_{nm})x_{nm}^U$ | $\forall (n,m) \in A$; | and
the at least one service constraint comprises:

| Service Constraints | Count |
|---|---|
| $z_n^P \leq y_n^R + y_n^P$ | $\forall n \in C$ |
| $z_n^U \leq y_n^R + y_n^P + y_n^U$ | $\forall n \in C$ |
| $z_n^P + z_n^U \leq 1$ | $\forall n \in C$. |

6. The method of claim 3 wherein:
   the linear programming application optimizes the summation of:

Objective $$\text{Maximize} \sum_{n \in C} (P_n^P z_n^P + P_n^U z_n^U) - \sum_{(n,m) \in A} (C_{nm} x_{nm}^R + 2 C_{nm} x_{nm}^P + C_{nm} x_{nm}^U) - \sum_{\ell \in \{1,2\}} \sum_{n \in C} \sum_{t \in T} Q_t q_{n,t}^\ell$$

and further wherein:
the at least one parameter comprises:

| Parameters | Count |
|---|---|
| $P_n^l$ = prize value of providing a level l service to potential customer node n. | $\forall l \in \{P, U\}$, $n \in C$ |
| $C_{nm}$ = cost of laying fiber on a street represented by (n, m) | $\forall (n, m) \in A$ |
| $L_{nm}$ = physical length of the street represented by (n, m) | $\forall (n, m) \in A$ |
| M = a large number used in the routing constraints | |
| $D^P$ = maximum length of the protected lateral | |
| $D^U$ = maximum length of the unprotected lateral | |
| $G_n^l$ distance from node n to a chosen gateway in direction l along an existing fiber | $\forall l \in \{1, 2\}$, $n \in E$ |
| $Q_t$ = cost of using equipment type t to build a customer connection) | $\forall t \in T$ |
| $R_t$ = range of the equipment type t | $\forall t \in T$ | the at least one variable comprises:

| Variables | Count | Domain |
|---|---|---|
| $x_{nm}^l = \begin{cases} 1 & \text{if arc (n, m) will be used on the layer l} \\ 0 & \text{otherwise} \end{cases}$ | $\forall l \in \{R, P, U, 1, 2\}, (n, m) \in A$ | binary |
| $y_n^l = \begin{cases} 1 & \text{if node n will be connected on the layer l} \\ 0 & \text{otherwise} \end{cases}$ | $\forall l \in \{R, P, U, 1, 2\}, n \in N$ | binary |
| $z_n^l = \begin{cases} 1 & \text{if potential customer node n meets all criteria for and will be connected with a service level l} \\ 0 & \text{otherwise} \end{cases}$ | $\forall l \in \{P, U\}$, $n \in C$ | binary |
| $d_n^l$ = distance from the "beginning" of a directed arc path to the node nonlayer l | $\forall l \in \{R, P, U, 1, 2\}, n \in N$ | continuous |
| $q_{n,t}^l = \begin{cases} 1 & \text{if potential customer node n will use the equipment type t to connecton layer l} \\ 0 & \text{otherwise} \end{cases}$ | $\forall l \in \{1, 2\}$, $n \in C$ | binary | the at least one connectivity constraint comprises:

| Connectivity Constraints | Count |
|---|---|
| $y_n^R = 1 \quad y_n^P = 0 \quad y_n^U = 0 \quad y_n^1 = 1 \quad y_n^2 = 1$ | $\forall n \in E$ |
| $\sum_{(n,m) \in \delta^+(m)} x_{nm}^l \geq y_m^l$ | $\forall l \in \{R, P, U, 1, 2\}, m \in N/E$ |
| $x_{n,m}^l \leq y_m^l$ | $\forall l \in \{R, P, U, 1, 2\}, (n, m) \in A$ |
| $y_n^R \leq \sum_{(n,m) \in \delta^-(n)} x_{nm}^R$ | $\forall n \in N/E$ (layer R only) |
| $y_n^R \geq x_{nm}^R$ | $\forall (n, m) \in A$ |
| $y_n^R + y_n^P \geq x_{nm}^P$ | $\forall (n, m) \in A$ |
| $y_n^R + y_n^P + y_n^U \geq x_{nm}^U$ | $\forall (n, m) \in A$ |
| $y_n^1 \geq x_{nm}^1$ | $\forall (n, m) \in A$ |
| $y_n^2 \geq x_{nm}^2$ | $\forall (n, m) \in A$ | the at least one saturation constraint comprises:

| Saturation Constraints | Count |
|---|---|
| $y_n^R + y_n^P + y_n^U \leq 1$ | $\forall n \in N$ |
| $x_{nm}^R + x_{mn}^R + x_{nm}^P + x_{mn}^P + x_{nm}^U + x_{mn}^U \leq 1$ | $\forall (n, m) \in A$ |
| $x_{nm}^1 \leq x_{nm}^R + x_{nm}^P + x_{nm}^U$ | $\forall (n, m) \in A$ |
| $x_{nm}^2 \leq x_{mn}^R + x_{nm}^P + x_{nm}^U$ | $\forall (n, m) \in A$ | the at least one distance constraint comprises:

| Distance Constraints | Count |
|---|---|
| $d_n^R = 0 \quad d_n^P = 0 \quad d_n^U = 0 \quad d_n^1 = G_n^1 \quad d_n^2 = G_n^2$ | $\forall n \in E$ |
| $d_n^R \leq M \quad d_n^P \leq D^P \quad d_n^U \leq D^U \quad d_n^1 \leq R_{max} \quad d_n^2 \leq R_{max}$ | $\forall n \in N$ |
| $-d_n^R + d_m^R \geq -M + (M + L_{nm}) x_{nm}^R$ | $\forall (n, m) \in A \mid m \notin E$ |
| $-d_n^P + d_m^P \geq -DP + (D^P + L_{nm}) x_{nm}^P$ | $\forall (n, m) \in A$ |
| $-d_n^U + d_m^U \geq -DU + (D^U + L_{nm}) x_{nm}^U$ | $\forall (n, m) \in A$ |
| $-d_n^1 + d_m^1 \geq -R_{max} + (R_{max} + L_{nm}) x_{nm}^1$ | $\forall (n, m) \in A$ |
| $-d_n^2 + d_m^2 \geq -R_{max} + (R_{max} + L_{nm}) x_{nm}^2$ | $\forall (n, m) \in A$ |
| $d_n^1 \leq R_t + (1 - q_{n,t}^1) M$ | $\forall n \in C, t \in T$ |
| $d_n^2 \leq R_t + (1 - q_{n,t}^2) M$ | $\forall n \in C, t \in T;$ | and
the at least one service constraint comprises:

| Service Constraints | Count |
|---|---|
| $q_{n,t}^l \leq y_n^l$ | $\forall l \in \{1, 2\}, n \in C$ |
| $z_n^P \leq \sum_{t \in T} q_{n,t}^l$ | $\forall l \in \{1, 2\}, n \in C$ |
| $z_n^U \leq \sum_{l \in \{1,2\}} \sum_{t \in T} q_{n,t}^l$ | $\forall n \in C$ |
| $z_n^P + z_n^U \leq 1$ | $\forall n \in C.$ |

7. A computer network comprising:
an optical communication network extending an existing optical communication network comprising at least a first node and a second node, the optical communication network to provide service to at least one new customer location, the optical communication network comprising at least one fiber path between the first node and the second node, the optical communication network configured in accordance with an integer programming model comprising:

identifying a plurality of arc paths and a plurality of nodes of a potential extension of the existing optical communication network sufficient to connect at least one potential customer location to the existing communication network, the at least one potential customer location including the at least one new customer location and associated with a value for connecting the at least one potential customer location to the existing optical communication network;

optimizing a summation of the value of connecting each of the at least one potential customer location less a cost of connecting each of the at least one potential customer locations using a combination of the plurality of arc paths beginning at the first node of the existing optical communication network and ending at the second node of the existing optical communication network, the integer programming application receiving as inputs at least one parameter, at least one variable, and a plurality of constraints including at least one connectivity constraint, at least one saturation constraint, at least one service constraint, and at least one distance constraint, the at least one distance constraint causing the combination of arc paths to not form an isolated loop.

8. The computer network of claim 7 wherein the optical communication network is further configured in accordance with a solution to the integer programming model comprising:

providing for at least three different types of connection paths to the at least one potential customer location, the types of connection paths comprising a ring path, a protected lateral path, and an unprotected lateral path;

the value of connecting the at least one potential customer location including one or more values accounting for whether the path is the ring path the protected lateral path or the unprotected lateral path; and the at least one distance constraint including at least a first distance constraint associated with the ring path and establishing about a maximum distance for the ring path, a second distance constraint associated with the protected lateral path and establishing about a maximum distance for the protected lateral path, and a third distance constraint associated with the unprotected lateral path and establishing about a maximum distance for the unprotected lateral path.

9. The computer network of claim 8 wherein the optical communication network is further configured in accordance with the solution to an integer programming model further wherein the cost of connecting each of the at least one potential customer locations includes at least one equipment type for connecting the at least one potential customer to the existing network and the at least one distance constraint accounts for a range of the at least one equipment types such that a path for connecting the at least one potential customer location to the existing network does not exceed the range of the at least one equipment type.

10. The computer network of claim 7 wherein:
the summation of the value of connecting each of the at least one potential customer locations less a cost of connecting each of the at least one potential customer locations comprises:

Objective $$\text{Maximize} \sum_{n \in C} P_n z_n - \sum_{(n,m) \in A} C_{nm} x_{nm}$$

and further wherein:
the at least one parameter comprises:
Parameters
$P_n$="prize" value of connecting a potential customer node n
$C_{nm}$=cost of laying fiber on the street represented by (n, m)
$L_{nm}$=physical length of the street represented by (n, m)
M=a large number used in the routing constraints
the at least one variable comprises:

| Variables | Count | Domain |
|---|---|---|
| $x_{nm} = \begin{cases} 1 \text{ if fiber will be buried along arc (n, m)} \\ 0 \text{ otherwise} \end{cases}$ | $\forall (n, m) \in A$ | binary |
| $y_n = \begin{cases} 1 \text{ if node n will be connected to the fiber network} \\ 0 \text{ otherwise} \end{cases}$ | $\forall n \in N$ | binary |
| $z_n = \begin{cases} 1 \text{ if potential customer node n meets all service criteria for collecting its "prize"} \\ 0 \text{ otherwise} \end{cases}$ | $\forall n \in C$ | binary |
| $d_n$ = lower bound on distance from the existing network to node n along a directed fiber path | $\forall n \in N$ | continuous | the at least one connectivity constraint comprises:

| Connectivity Constraints | Count |
|---|---|
| $y_n = 1$ | $\forall n \in E$ |
| $\sum_{(n,m) \in \delta^+(m)} x_{nm} \geq y_m$ | $\forall m \in N/E$ |
| $x_{nm} \leq y_m$ | $\forall (n, m) \in A$ |
| $y_n \leq \sum_{(n,m) \in \delta^-(n)} x_{nm}$ | $\forall n \in N/E$ |
| $y_n \geq x_{nm}$ | $\forall (n, m) \in A$ | the at least one saturation constraint comprises:

| Saturation Constraints | Count |
|---|---|
| $x_{nm} + x_{mn} \leq 1$ | $\forall (n,m) \in A$ | the at least one distance constraint comprises:

| Distance Constraints | Count |
|---|---|
| $d_n = 0$ | $\forall n \in E$ |
| $-d_n + d_m \geq -M + (M + L_{nm})x_{nm}$ | $\forall (n, m) \in A \mid m \notin E$ | and
the at least one service constraint comprises:

| Service Constraints | Count |
|---|---|
| $z_n^P \leq y_n^R + y_n^P$ | $\forall n \in C$ |
| $z_n^U \leq y_n^R + y_n^P + y_n^U$ | $\forall n \in C$ |
| $z_n^P + z_n^U \leq 1$ | $\forall n \in C$ |

11. The computer network of claim 8 wherein:
the linear programming application optimizes the summation of:

Objective $$\text{Maximize} \sum_{n \in C} (P_n^P z_n^P + P_n^U z_n^U) - \sum_{(n,m) \in A} (C_{nm} x_{nm}^L + 2C_{nm} x_{nm}^P + C_{nm} x_{nm}^U)$$

and further wherein:

the at least one parameter comprises:

| Parameters | Count |
|---|---|
| $P_n^l$: "prize" value of providing a level l service to the potential customer node n. | $\forall l \in \{P, U\}$, $n \in C$ |
| $C_{nm}$: cost of laying fiber on a street represented by (n, m) | $\forall (n, m) \in A$ |
| $L_{nm}$: physical length of the street represented by (n, m) | $\forall (n, m) \in A$ |
| M: a large number used in the routing constraints | |
| $D^P$: maximum length of the protected lateral | |
| $D^U$: maximum length of the unprotected lateral | | the at least one variable comprises:

| Variables | | Count | Domain |
|---|---|---|---|
| $x_{nm}^l = \begin{cases} 1 \text{ if fiber will be buried along arc (n, m) on layer l} \\ 0 \text{ otherwise} \end{cases}$ | | $\forall l \in \{R, P, U\}$, $(n, m) \in A$ | binary |
| $y_n^l = \begin{cases} 1 \text{ if node n will be connected on layer l} \\ 0 \text{ otherwise} \end{cases}$ | | $\forall l \in \{R, P, U\}$, $n \in N$ | binary |
| $z_n^l = \begin{cases} 1 \text{ if potential customer node n meets all criteria for} \\ \text{and will be connected with service level l} \\ 0 \text{ otherwise} \end{cases}$ | | $\forall l \in \{P, U\}$, $n \in C$ | binary |
| $d_n^l$ = distance from the "beginning" of a directed arc path to node nonlayer l | | $\forall l \in \{R, P, U\}$, $n \in N$ | continuous | the at least one connectivity constraint comprises:

| Connectivity Constraints | Count |
|---|---|
| $y_n^R = 1 \quad y_n^P = 0 \quad y_n^U = 0$ | $\forall n \in E$ |
| $\sum_{(n,m) \in \delta^+(m)} x_{nm}^l \geq y_m^l$ | $\forall l \in \{R, P, U\}, m \in N/E$ |
| $x_{nm}^l \leq y_m^l$ | $\forall l \in \{R, P, U\}, (n, m) \in A$ |
| $y_n^R \leq \sum_{(n,m) \in \delta^-(n)} x_{nm}^R$ | $\forall n \in N/E$ (layer R only) |
| $y_n^R \geq x_{nm}^R$ | $\forall (n, m) \in A$ |
| $y_n^R + y_n^P \geq x_{nm}^P$ | $\forall (n, m) \in A$ |
| $y_n^R + y_n^P + y_n^U \geq x_{nm}^U$ | $\forall (n, m) \in A$ | the at least one saturation constraint comprises:

| Saturation Constraints | Count |
|---|---|
| $y_n^R + y_n^P + y_n^U \leq 1$ | $\forall n \in N$ |
| $x_{nm}^R + x_{mn}^R + x_{nm}^P + x_{mn}^P + x_{nm}^U + x_{mn}^U \leq 1$ | $\forall (n, m) \in A$ | the at least one distance constraint comprises:

| Distance Constraints | Count |
|---|---|
| $d_n^R = 0 \quad d_n^P = 0 \quad d_n^U = 0$ | $n \in E$ |
| $d_n^R \leq M \quad d_n^P \leq D^P \quad d_n^U \leq D^U$ | $n \in N$ |
| $-d_n^R + d_m^R \geq -M + (M + L_{nm})x_{nm}^R$ | $\forall (n, m) \in A \mid m \notin E$ |
| $-d_n^P + d_m^P \geq -D^P + (D^P + L_{nm})x_{nm}^P$ | $\forall (n, m) \in A$ |
| $-d_n^U + d_m^U \geq -D^U + (D^U + L_{nm})x_{nm}^U$ | $\forall (n, m) \in A$; | and
the at least one service constraint comprises:

| Service Constraints | Count |
|---|---|
| $z_n^P \leq y_n^R + y_n^P$ | $\forall n \in C$ |
| $z_n^U \leq y_n^R + y_n^P + y_n^U$ | $\forall n \in C$ |
| $z_n^P + z_n^U \leq 1$ | $\forall n \in C$. |

12. The computer network of claim 9 wherein:
the linear programming application optimizes the summation of:

Objective $$\text{Maximize} \sum_{n \in C} (P_n^P z_n^P + P_n^U z_n^U) - \sum_{(n,m) \in A} (C_{nm} x_{nm}^R + 2 C_{nm} x_{nm}^P + C_{nm} x_{nm}^U) - \sum_{\ell \in \{1,2\}} \sum_{n \in C} \sum_{t \in T} Q_t q_{n,t}^\ell$$

and further wherein:
the at least one parameter comprises:

| Parameters | Count |
|---|---|
| $P_n^l$ = prize value of providing a level l service to potential customer node n. | $\forall l \in \{P, U\}$, $n \in C$ |
| $C_{nm}$ = cost of laying fiber on a street represented by (n, m) | $\forall (n, m) \in A$ |
| $L_{nm}$ = physical length of the street represented by (n, m) | $\forall (n, m) \in A$ |
| M = a large number used in the routing constraints | |
| $D^P$ = maximum length of the protected lateral | |
| $D^U$ = maximum length of the unprotected lateral | |
| $G_n^l$ distance from node n to a chosen gateway in direction l along an existing fiber | $\forall l \in \{1, 2\}$, $n \in E$ |
| $Q_t$ = cost of using equipment type t to build a customer connection) | $\forall t \in T$ |
| $R_t$ = range of the equipment type t | $\forall t \in T$ | the at least one variable comprises:

| Variables | | Count | Domain |
|---|---|---|---|
| $x_{nm}^l = \begin{cases} 1 \text{ if arc (n, m) will be used on the layer l} \\ 0 \text{ otherwise} \end{cases}$ | | $\forall l \in \{R, P, U, 1, 2\}$, $(n, m) \in A$ | binary |
| $y_n^l = \begin{cases} 1 \text{ if node n will be connected on the layer l} \\ 0 \text{ otherwise} \end{cases}$ | | $\forall l \in \{R, P, U, 1, 2\}$, $n \in N$ | binary |

-continued

| Variables | Count | Domain |
|---|---|---|
| $z_n^l = \begin{cases} 1 \text{ if potential customer node n meets all criteria for and} \\ \phantom{1} \text{will be connected with a service level l} \\ 0 \text{ otherwise} \end{cases}$ | $\forall l \in \{P, U\}$, $n \in C$ | binary |
| $d_n^l$ = distance from the "beginning" of a directed arc path to the node nonlayer l | $\forall l \in \{R, P, U, 1, 2\}, n \in N$ | continuous |
| $q_{n,t}^l = \begin{cases} 1 \text{ if potential customer node n will use the equipment} \\ \phantom{1} \text{type t to connecton layer l} \\ 0 \text{ otherwise} \end{cases}$ | $\forall l \in \{1, 2\}$, $n \in C$ | binary | the at least one connectivity constraint comprises:

| Connectivity Constraints | Count |
|---|---|
| $y_n^R = 1 \quad y_n^P = 0 \quad y_n^U = 0 \quad y_n^1 = 1 \quad y_n^2 = 1$ | $\forall n \in E$ |
| $\sum_{(n,m) \in \delta^+(m)} x_{nm}^l \geq y_m^l$ | $\forall l \in \{R, P, U, 1, 2\}$, $m \in N/E$ |
| $x_{nm}^l \leq y_m^l$ | $\forall l \in \{R, P, U, 1, 2\}$, $(n, m) \in A$ |
| $y_n^R \leq \sum_{(n,m) \in \delta^-(n)} x_{nm}^R$ | $\forall n \in N/E$ (layer R only) |
| $y_n^R \geq x_{nm}^R$ | $\forall (n, m) \in A$ |
| $y_n^R + y_n^P \geq x_{nm}^P$ | $\forall (n, m) \in A$ |
| $y_n^R + y_n^P + y_n^U \geq x_{nm}^U$ | $\forall (n, m) \in A$ |
| $y_n^1 \geq x_{nm}^1$ | $\forall (n, m) \in A$ |
| $y_n^2 \geq x_{nm}^2$ | $\forall (n, m) \in A$ | the at least one saturation constraint comprises:

| Saturation Constraints | Count |
|---|---|
| $y_n^R + y_n^P + y_n^U \leq 1$ | $\forall n \in N$ |
| $x_{nm}^R + x_{mn}^R + x_{nm}^P + x_{mn}^P + x_{nm}^U + x_{mn}^U \leq 1$ | $\forall (n, m) \in A$ |
| $x_{nm}^1 \leq x_{nm}^R + x_{nm}^P + x_{nm}^U$ | $\forall (n, m) \in A$ |
| $x_{nm}^2 \leq x_{nm}^R + x_{nm}^P + x_{nm}^U$ | $\forall (n, m) \in A$ | the at least one distance constraint comprises:

| Distance Constraints | Count |
|---|---|
| $d_n^R = 0 \quad d_n^P = 0 \quad d_n^U = 0 \quad d_n^1 = G_n^1 \quad d_n^2 = G_n^2$ | $\forall n \in E$ |
| $d_n^R \leq M \quad d_n^P \leq D^P \quad d_n^U \leq D^U \quad d_n^1 \leq R_{max} \quad d_n^2 \leq R_{max}$ | $\forall n \in N$ |
| $-d_n^R + d_m^R \geq -M + (M + L_{nm})x_{nm}^R$ | $\forall (n, m) \in A \mid m \notin E$ |
| $-d_n^P + d_m^P \geq -D^P + (D^P + L_{nm})x_{nm}^P$ | $\forall (n, m) \in A$ |
| $-d_n^U + d_m^U \geq -D^U + (D^U + L_{nm})x_{nm}^U$ | $\forall (n, m) \in A$ |
| $-d_n^1 + d_m^1 \geq -R_{max} + (R_{max} + L_{nm})x_{nm}^1$ | $\forall (n, m) \in A$ |
| $-d_n^2 + d_m^2 \geq -R_{max} + (R_{max} + L_{nm})x_{nm}^2$ | $\forall (n, m) \in A$ |
| $d_n^1 \leq R_t + (1 - q_{n,t}^1)M$ | $\forall n \in C, t \in T$ |
| $d_n^2 \leq R_t + (1 - q_{n,t}^2)M$ | $\forall n \in C, t \in T$; | and
the at least one service constraint comprises:

| Service Constraints | Count |
|---|---|
| $q_{n,t}^l \leq y_n^l$ | $\forall l \in \{1, 2\}, n \in C$ |
| $z_n^P \leq \sum_{t \in T} q_{n,t}^l$ | $\forall l \in \{1, 2\}, n \in C$ |
| $z_n^U \leq \sum_{l \in \{1,2\}} \sum_{t \in T} q_{n,t}^l$ | $\forall n \in C$ |
| $z_n^P + z_n^U \leq 1$ | $\forall n \in C$. |

13. A non-transitory computer readable medium comprising executable instructions configured to perform the method of claim 1.

14. A non-transitory computer readable medium comprising executable instructions configured to perform the method of claim 2.

15. A non-transitory computer readable medium comprising executable instructions configured to perform the method of claim 3.

16. A non-transitory computer readable medium comprising executable instructions configured to perform the method of claim 4.

17. A non-transitory computer readable medium comprising executable instructions configured to perform the method of claim 5.

18. A non-transitory computer readable medium comprising executable instructions configured to perform the method of claim 6.

\* \* \* \* \*